United States Patent
Sasaki et al.

[19]

[11] Patent Number: 5,907,191
[45] Date of Patent: May 25, 1999

[54] POWER OUTPUT APPARATUS AND METHOD OF CONTROLLING THE SAME

[75] Inventors: Shoichi Sasaki; Tetsuya Abe; Masaaki Yamaoka, all of Toyota, Japan

[73] Assignee: Toyota Jidosha Kabushiki Kaisha, Tokyo, Japan

[21] Appl. No.: 08/877,809

[22] Filed: Jun. 18, 1997

[30] Foreign Application Priority Data

Sep. 24, 1996 [JP] Japan .................................. 8-274112

[51] Int. Cl.[6] .............................. B60L 11/12; B61C 9/38
[52] U.S. Cl. ............................... 290/19; 290/17; 290/18; 290/19; 290/51; 290/16; 290/40 R; 290/40 A; 290/40 B
[58] Field of Search ................................ 290/44, 17, 18, 290/19, 40 R; 477/5, 3; 180/65.2, 65.6

[56] References Cited

U.S. PATENT DOCUMENTS

| | | | |
|---|---|---|---|
| 4,951,769 | 8/1990 | Kawamura .............................. | 180/65.4 |
| 5,142,903 | 9/1992 | Mizushima et al. .................... | 73/118.1 |
| 5,258,651 | 11/1993 | Sherman ..................................... | 29/23 |
| 5,558,588 | 9/1996 | Schmidt ...................................... | 475/5 |
| 5,558,589 | 9/1996 | Schmidt ...................................... | 475/5 |
| 5,558,595 | 9/1996 | Schmidt et al. ............................ | 477/3 |
| 5,562,566 | 10/1996 | Yang ............................................ | 477/3 |
| 5,643,119 | 7/1997 | Yamaguchi et al. ....................... | 475/5 |
| 5,735,770 | 4/1998 | Omote et al. ............................... | 477/5 |

FOREIGN PATENT DOCUMENTS

| | | | |
|---|---|---|---|
| 4124479 | 1/1993 | Germany ................... | 296/19 |
| 50-30223 | 3/1975 | Japan ....................... | 290/19 |

Primary Examiner—Elvin G. Enad
Attorney, Agent, or Firm—Oliff & Berridge, PLC

[57] ABSTRACT

A power output apparatus 110 includes a planetary gear 120 having a planetary carrier, a sun gear, and a ring gear, an engine 150 having a crankshaft 156 linked with the planetary carrier, a first motor MG1 attached to the sun gear, and a second motor MG2 attached to the ring gear. When the driver steps on an accelerator pedal 164 to change the driving point of the engine 150, the power output apparatus 110 calculates an angular acceleration of the sun gear, calculates a torque used for changing the driving point of the engine 150 by multiplying the angular acceleration by a moment of inertia seen from the first motor MG1 of an inertial system consisting of the first motor MG1 and the engine 150, and drives the second motor MG2 by taking into account the torque. This structure enables a desired torque to be output even in a transient time.

13 Claims, 13 Drawing Sheets

POWER OUTPUT APPARATUS AND METHOD OF CONTROLLING THE SAME

BACKGROUND OF THE INVENTION

1. Field of the Invention

The present invention relates to a power output apparatus and a method of controlling the same. More specifically the present invention pertains to a power output apparatus for outputting power generated by an engine to a drive shaft with a high efficiency, and also to a method of controlling such a power output apparatus.

2. Description of the Prior Art

Known power output apparatuses for carrying out torque conversion of power output from an engine and outputting the converted power to a drive shaft include a combination of a fluid-based torque converter with a transmission. In such a power output apparatus, the torque converter is disposed between an output shaft of the engine and a rotating shaft linked with the transmission, and transmits the power between the rotating shaft and the output shaft through a flow of the sealed fluid. Since the torque converter transmits the power through a flow of the fluid, there is a slip between the output shaft and the rotating shaft, which leads to an energy loss corresponding to the slip. The energy loss is expressed as the product of the revolving speed difference between the rotating shaft and the output shaft and the torque transmitted to the output shaft, and is consumed as heat.

In a vehicle with such a power output apparatus mounted thereon as its power source, at the time when there is a large slip between the rotating shaft and the output shaft, that is, when a significantly large power is required, for example, at the time of starting the vehicle or running the vehicle on an upward slope at a low speed, a large energy loss in the torque converter undesirably lowers the energy efficiency. Even in a stationary driving state, the efficiency of power transmission by the torque converter is not 100%, and the fuel consumption rate in the conventional power output apparatus is thereby lower than that in a manual transmission.

In order to solve such problems, the applicants have proposed a system that does not include the fluid-based torque converter but has an engine, a planetary gear unit, a generator, a motor, and a battery and outputs the power from the motor to the drive shaft by utilizing the power output from the engine or electric power stored in the battery (JAPANESE PATENT LAYING-OPEN GAZETTE No. 50-30223). In this reference, however, there is no description of a control procedure in a transient time while the target driving state of the engine is being changed.

SUMMARY OF THE INVENTION

One object of the present invention is thus to provide a power output apparatus for outputting power from an engine to a drive shaft with a high efficiency, as well as a method of controlling such a power output apparatus.

Another object of the present invention is to output a target power stably to the drive shaft even in a transient time while the target driving state of the engine is being changed.

At least part of the above and the other related objects is realized by a power output apparatus of the present invention for outputting power to a drive shaft, the power output apparatus comprises: an engine having an output shaft; a first motor having a rotating shaft and inputting and outputting power to and from the rotating shaft; a second motor inputting and outputting power to and from the drive shaft; three shaft-type power input/output means having three shafts respectively linked with the drive shaft, the output shaft, and the rotating shaft, the three shaft-type power input/output means inputting and outputting power to and from a residual one shaft, based on predetermined powers input to and output from any two shafts among the three shafts; storage battery means being charged with an electric power output from the first motor, being discharged to supply an electric power input to the first motor, being charged with an electric power output from the second motor, and being discharged to supply an electric power input to the second motor; target power setting means for setting a target power to be output to the drive shaft; driving state setting means for setting a driving state of the engine based on the target power set by the target power setting means; operation control means for controlling the engine and the first motor, in order to enable the engine to be driven in the driving state set by the driving state setting means; power calculation means for calculating a power input to and output from the drive shaft via the three shaft-type power input/output means, accompanied by the control of the engine and the first motor by the operation control means; and motor control means for controlling the second motor, in order to enable the target power to be output to the drive shaft based on the power calculated by the power calculation means and the target power set by the target power setting means.

The power output apparatus of the present invention calculates the power input to and output from the drive shaft via the three shaft-type power input/output means, accompanied by the control of the engine and the first motor, and controls the second motor in order to enable the target power to be output to the drive shaft based on the calculated power and the target power. Even in a transient time immediately after the driving state of the engine has been changed, the target power can be stably output to the drive shaft. This structure effectively prevents the power output to the drive shaft from being varied with a variation in driving state of the engine. In this power output apparatus, the power output from the engine is subjected to the torque conversion and output to the drive shaft.

In the power output apparatus of the present invention, the power calculation means may include means for calculating the power input to and output from the drive shaft based on a rate of change of the revolving speed of the output shaft of the engine, or means for calculating the power based on a rate of change of the revolving speed of the rotating shaft of the first motor. The power input to and output from the drive shaft may be calculated based on either the rate of change of the revolving speed of the output shaft of the engine or the rate of change of the revolving speed of the rotating shaft of the first motor, since a change in driving state of the engine appears as the rate of change of the revolving speed of the output shaft of the engine and also as the rate of the change of the revolving speed of the rotating shaft of the first motor via the three shaft-type power input/output means.

In accordance with one preferable application of the power output apparatus, the driving state setting means may include means for setting the driving state of the engine, in order to enable a power corresponding to the target power to be output from the engine. This structure allows the power output from the engine to be subjected to the torque conversion and output to the drive shaft. In the power output apparatus of this preferable application, the driving state setting means may further include means for setting the driving state of the engine in order to enhance the efficiency of the engine. This structure enhances the efficiency of the whole power output apparatus.

In accordance with another preferable application of the power output apparatus, the driving state setting means may include means for setting an operation stop condition as the driving state of the engine when the target power is less than a predetermined value or when the driver gives a predetermined instruction. This structure enables the target power to be output to the drive shaft even at the time of stopping the operation of the engine.

At least part of the above and the other related objects is realized by a method of controlling a power output apparatus for outputting power to a drive shaft, the method of the present invention comprises the steps of: (a) providing (1) an engine having an output shaft, (2) a first motor having a rotating shaft and inputting and outputting power to and from the rotating shaft, (3) a second motor inputting and outputting power to and from the drive shaft, (4) three shaft-type power input/output means having three shafts respectively linked with the drive shaft, the output shaft, and the rotating shaft, the three shaft-type power input/output means inputting and outputting power to and from a residual one shaft, based on predetermined powers input to and output from any two shafts among the three shafts, and (5) storage battery means being charged with an electric power output from the first motor, being discharged to supply an electric power input to the first motor, being charged with an electric power output from the second motor, and being discharged to supply an electric power input to the second motor; (b) setting a driving state of the engine based on a target power to be output to the drive shaft; (c) controlling the engine and the first motor, in order to enable the engine to be driven in the driving state set in the step (b); (d) calculating a power input to and output from the drive shaft via the three shaft-type power input/output means, accompanied by the control of the engine and the first motor in the step (c); and (e) controlling the second motor, in order to enable the target power to be output to the drive shaft based on the power calculated in the step (d) and the target power.

The method of controlling the power output apparatus of the present invention calculates the power input to and output from the drive shaft via the three shaft-type power input/output means, accompanied by the control of the engine and the first motor, and controls the second motor in order to enable the target power to be output to the drive shaft based on the calculated power and the target power. Even in a transient time immediately after the driving state of the engine has been changed, the target power can be stably output to the drive shaft. This structure effectively prevents the power output to the drive shaft from being varied with a variation in a driving state of the engine. This method enables the power output from the engine to be subjected to the torque conversion and output to the drive shaft.

These and other objects, features, aspects, and advantages of the present invention will become more apparent from the following detailed description of the preferred embodiment with the accompanying drawings.

DESCRIPTION OF THE PREFERRED EMBODIMENTS

Figure 1:
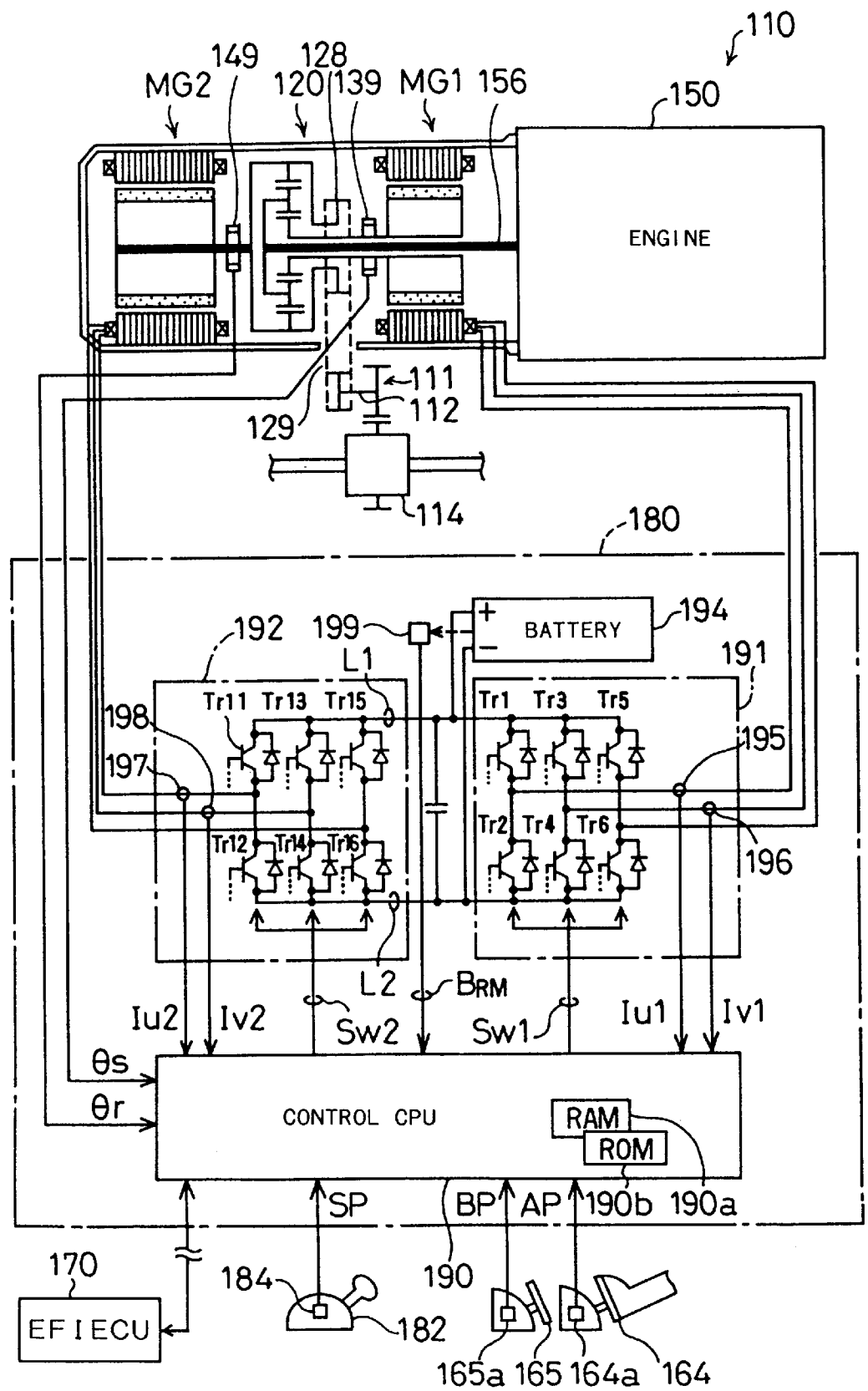
FIG. 1 schematically illustrates the structure of a power output apparatus 110 embodying the present invention.
Figure 2:
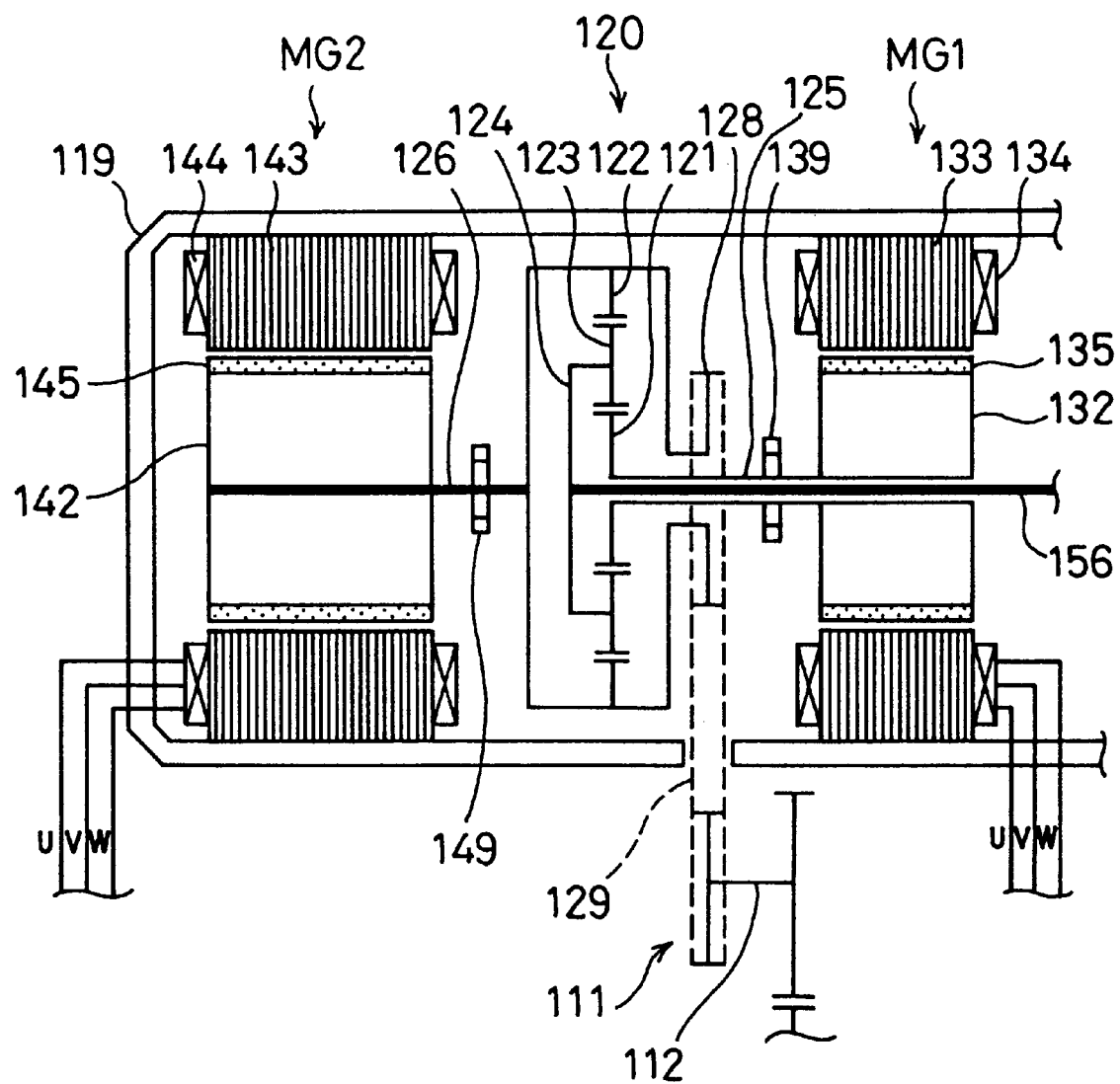
FIG. 2 is an enlarged view illustrating an essential part of the power output apparatus 110 of the embodiment.
Figure 3:
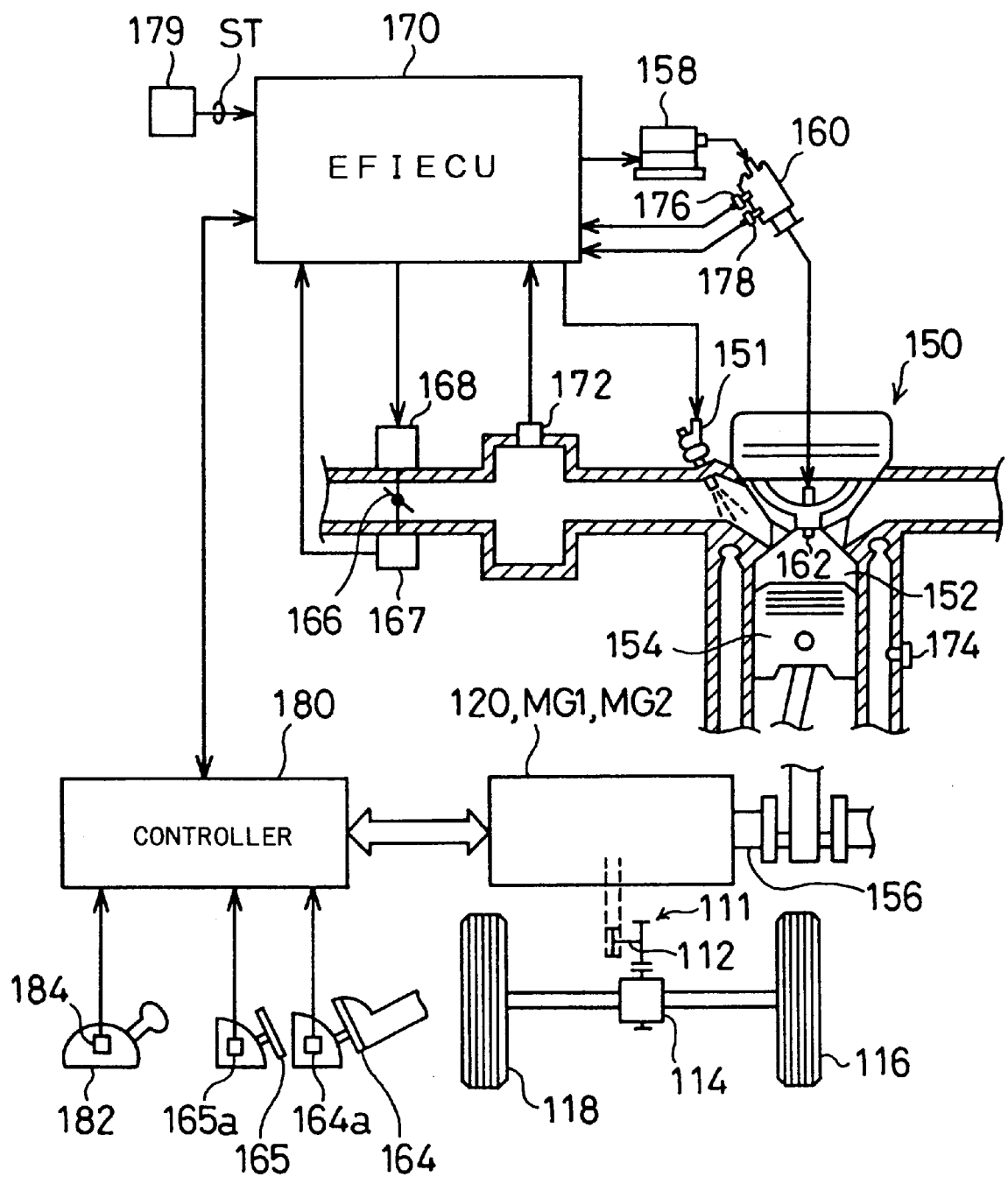
FIG. 3 schematically illustrates the general structure of a vehicle with the power output apparatus 110 of the embodiment incorporated therein.

One mode of carrying out the present invention is described as a preferred embodiment. FIG. 1 schematically illustrates the structure of a power output apparatus 110 embodying the present invention; FIG. 2 is an enlarged view illustrating an essential part of the power output apparatus 110 of the embodiment; and FIG. 3 schematically illustrates the general structure of a vehicle with the power output apparatus 110 of the embodiment incorporated therein. The general structure of the vehicle is described first for the convenience of explanation.

Referring to FIG. 3, the vehicle is provided with an engine 150 which consumes gasoline as a fuel and outputs power. The air ingested from an air supply system via a throttle valve 166 is mixed with a fuel, that is, gasoline in this embodiment, injected from a fuel injection valve 151. The air/fuel mixture is supplied into a combustion chamber 152 to be explosively ignited and burned. Linear motion of a piston 154 pressed down by the explosion of the air/fuel mixture is converted to rotational motion of a crankshaft 156. The throttle valve 166 is driven to open and close by an actuator 168. An ignition plug 162 converts a high voltage applied from an igniter 158 via a distributor 160 to a spark, which explosively ignites and combusts the air/fuel mixture.

Operation of the engine 150 is controlled by an electronic control unit (hereinafter referred to as EFIECU) 170. The EFIECU 170 receives information from various sensors, which detect operating conditions of the engine 150. These sensors include a throttle valve position sensor 167 for detecting a valve travel or position of the throttle valve 166, a manifold vacuum sensor 172 for measuring a load applied to the engine 150, a water temperature sensor 174 for measuring the temperature of cooling water in the engine 150, and a speed sensor 176 and an angle sensor 178 mounted on the distributor 160 for measuring the revolving speed (the number of revolutions per a predetermined time period) and the rotational angle of the crankshaft 156. A starter switch 179 for detecting a starting condition ST of an ignition key (not shown) is also connected to the EFIECU 170. Other sensors and switches connecting with the EFIECU 170 are omitted from the illustration.

The crankshaft 156 of the engine 150 is mechanically linked with a power transmission gear 111, which has a drive shaft 112 as a rotating axis, via a planetary gear 120 and first and second motors MG1 and MG2 (described later in detail). The power transmission gear 111 is further linked with a differential gear 114, so that the power output from the power output apparatus 110 is eventually transmitted to left and right driving wheels 116 and 118. The first motor MG1 and the second motor MG2 are electrically connected to and controlled by a controller 180. The controller 180 includes an internal control CPU and receives inputs from a gearshift position sensor 184 attached to a gearshift 182, an accelerator position sensor 164*a* attached to an accelerator pedal 164, and a brake pedal position sensor 165*a* attached to a brake pedal 165, as described later in detail. The controller 180 sends and receives a variety of data and information to and from the EFIECU 170 through communication. Details of the control procedure including a communication protocol will be described later.

Referring to FIGS. 1 and 2, the power output apparatus 110 of the embodiment primarily includes the engine 150, the planetary gear 120 having a planetary carrier 124 mechanically linked with the crankshaft 156 of the engine 150, the first motor MG1 linked with a sun gear 121 of the planetary gear 120, the second motor MG2 linked with a ring gear 122 of the planetary gear 120, and the controller 180 for driving and controlling the first and the second motors MG1 and MG2.

The following describes the structure of the planetary gear 120 and the first and the second motors MG1, MG2 shown in FIG. 2. The planetary gear 120 includes the sun gear 121 linked with a hollow sun gear shaft 125 through which the crankshaft 156 passes through, the ring gear 122 linked with a ring gear shaft 126 coaxial with the crankshaft 156, a plurality of planetary pinion gears 123 arranged between the sun gear 121 and the ring gear 122 to revolve around the sun gear 121 while rotating on its axis, and the planetary carrier 124 connecting with one end of the crankshaft 156 to support the rotating shafts of the planetary pinion gears 123. In the planetary gear 120, three shafts, that is, the sun gear shaft 125, the ring gear shaft 126, and the crankshaft 156 respectively connecting with the sun gear 121, the ring gear 122, and the planetary carrier 124, work as input and output shafts of the power. Determination of the powers input to and output from any two shafts among the three shafts automatically determines the power input to and output from the residual one shaft. The details of the input and output operations of the power into and from the three shafts of the planetary gear 120 will be discussed later.

A power feed gear 128 for taking out the power is linked with the ring gear 122 and arranged on the side of the first motor MG1. The power feed gear 128 is further connected to the power transmission gear 111 via a chain belt 129, so that the power is transmitted between the power feed gear 128 and the power transmission gear 111.

The first motor MG1 is constructed as a synchronous motor-generator and includes a rotor 132 having a plurality of permanent magnets 135 on its outer surface and a stator 133 having three-phase coils 134 wound thereon to form a revolving magnetic field. The rotor 132 is linked with the sun gear shaft 125 connecting with the sun gear 121 of the planetary gear 120. The stator 133 is prepared by laying thin plates of non-directional electromagnetic steel one upon another and is fixed to a casing 119. The first motor MG1 works as a motor for rotating the rotor 132 through the interaction between a magnetic field produced by the permanent magnets 135 and a magnetic field produced by the three-phase coils 134, or as a generator for generating an electromotive force on either ends of the three-phase coils 134 through the interaction between the magnetic field produced by the permanent magnets 135 and the rotation of the rotor 132. The sun gear shaft 125 is further provided with a resolver 139 for measuring its rotational angle $\theta s$.

Like the first motor MG1, the second motor MG2 is also constructed as a synchronous motor-generator and includes a rotor 142 having a plurality of permanent magnets 145 on its outer surface and a stator 143 having three-phase coils 144 wound thereon to form a revolving magnetic field. The rotor 142 is linked with the ring gear shaft 126 connecting with the ring gear 122 of the planetary gear 120, whereas the stator 143 is fixed to the casing 119. The stator 143 of the motor MG2 is also produced by laying thin plates of non-directional electromagnetic steel one upon another. Like the first motor MG1, the second motor MG2 also works as a motor or a generator. The ring gear shaft 126 is further provided with a resolver 149 for measuring its rotational angle $\theta r$.

The controller 180 for driving and controlling the first and the second motor MG1 and MG2 has the following configuration. Referring back to FIG. 1, the controller 180 includes a first driving circuit 191 for driving the first motor MG1, a second driving circuit 192 for driving the second motor MG2, a control CPU 190 for controlling both the first and the second driving circuits 191 and 192, and a battery 194 including a number of secondary cells. The control CPU 190 is a one-chip microprocessor including a RAM 190*a* used as a working memory, a ROM 190*b* in which various control programs are stored, an input/output port (not shown), and a serial communication port (not shown) through which data are sent to and received from the EFIECU 170. The control CPU 190 receives a variety of data via the input port. The input data include a rotational angle $\theta s$ of the sun gear shaft 125 measured with the resolver 139, a rotational angle $\theta r$ of the ring gear shaft 126 measured with the resolver 149, an accelerator pedal position AP (step-on amount of the accelerator pedal 164) output from the accelerator position sensor 164*a*, a brake pedal position BP (step-on amount of the brake pedal 165) output from the brake pedal position sensor 165*a*, a gearshift position SP output from the gearshift position sensor 184, values of currents Iu1 and Iv1 from two ammeters 195 and 196 disposed in the first driving circuit 191, values of currents Iu2 and Iv2 from two ammeters 197 and 198 disposed in the second driving circuit 192, and a remaining charge BRM of the battery 194 measured with a remaining charge meter 199. The remaining charge meter 199 may determine the remaining charge BRM of the battery 194 by any known method; for example, by measuring the specific gravity of an electrolytic solution in the battery 194 or the whole weight of the battery 194, by computing the currents and time of charge and discharge, or by causing an instantaneous short circuit between terminals of the battery 194 and measuring an internal resistance against the electric current.

The control CPU 190 outputs a first control signal SW1 for driving six transistors Tr1 through Tr6 working as switching elements of the first driving circuit 191 and a second control signal SW2 for driving six transistors Tr1 through Tr6 working as switching elements of the second driving circuit 192. The six transistors Tr1 through Tr6 in the first driving circuit 191 constitute a transistor inverter and are arranged in pairs to work as a source and a drain with respect to a pair of power lines L1 and L2. The three-phase coils (U,V,W) 134 of the first motor MG1 are connected to the respective contacts of the paired transistors in the first driving circuit 191. The power lines L1 and L2 are respectively connected to plus and minus terminals of the battery 194. The control signal SW1 output from the control CPU 190 thus successively controls the power-on time of the paired transistors Tr1 through Tr6. The electric currents flowing through the three-phase coils 134 undergo PWM (pulse width modulation) control to give quasi-sine waves, which enable the three-phase coils 134 to form a revolving magnetic field.

The six transistors Tr11 through Tr16 in the second driving circuit 192 also constitute a transistor inverter and are arranged in the same manner as the transistors Tr1 through Tr6 in the first driving circuit 191. The three-phase coils (U,V,W) 144 of the second motor MG2 are connected to the respective contacts of the paired transistors in the second driving circuit 191. The second control signal SW2 output from the control CPU 190 thus successively controls the power-on time of the paired transistors Tr11 through Tr16. The electric currents flowing through the three-phase coils 144 undergo PWM control to give quasi-sine waves, which enable the three-phase coils 144 to form a revolving magnetic field.

Figure 4:
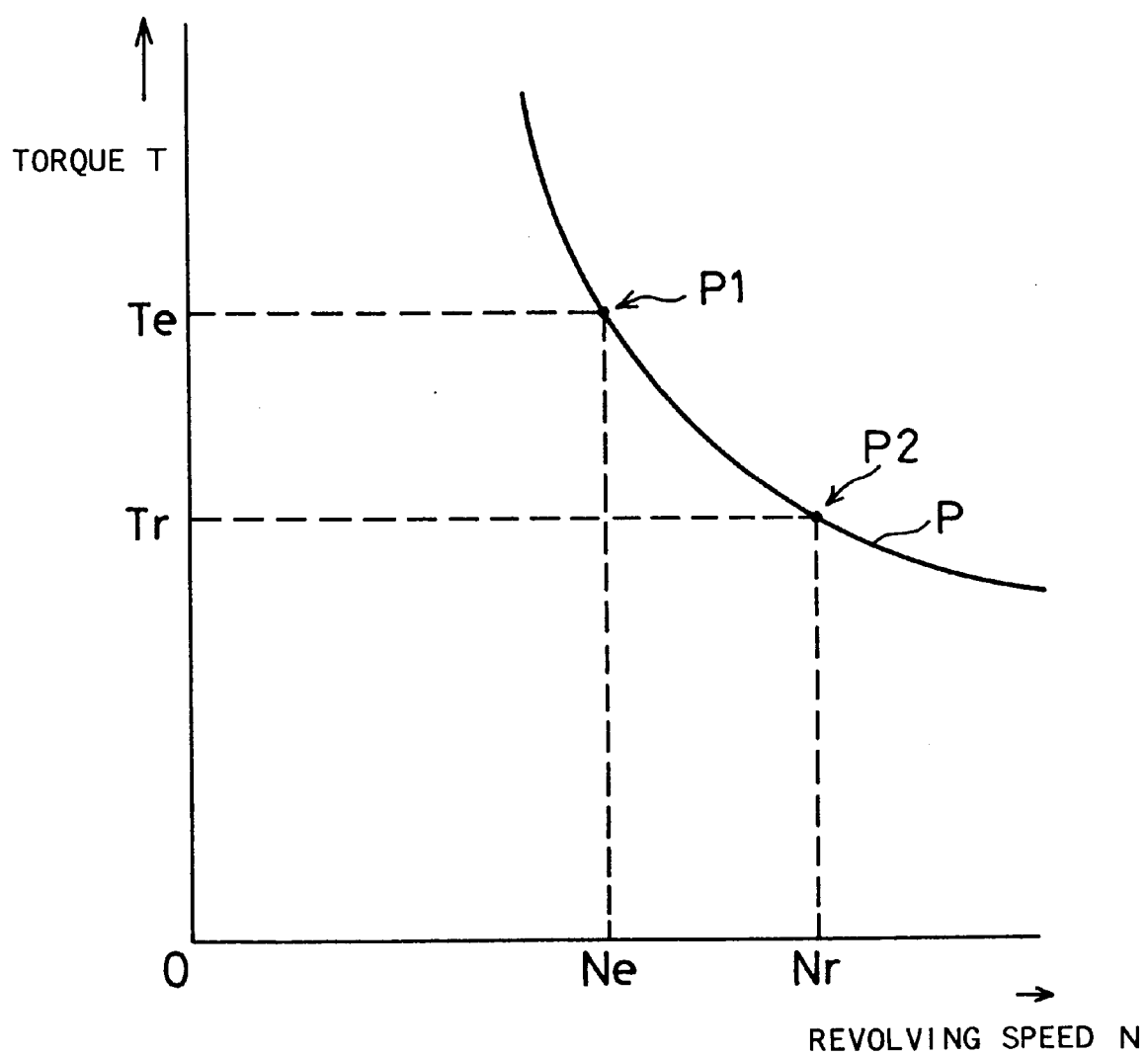
FIG. 4 is a graph showing the operation principle of the power output apparatus 110 of the embodiment.

The power output apparatus 110 of the embodiment thus constructed works in accordance with the operation principles discussed below, especially with the principle of torque conversion. By way of example, it is assumed that the engine 150 is driven at a driving point P1 of the revolving speed Ne and the torque Te and that the ring gear shaft 126 is driven at another driving point P2, which is defined by another revolving speed Nr and another torque Tr but gives an amount of energy identical with an energy Pe output from the engine 150. This means that the power output from the engine 150 is subjected to torque conversion and applied to the ring gear shaft 126. The relationship between the torque and the revolving speed of the engine 150 and the ring gear shaft 126 under such conditions is shown in the graph of FIG. 4.

Figure 5:
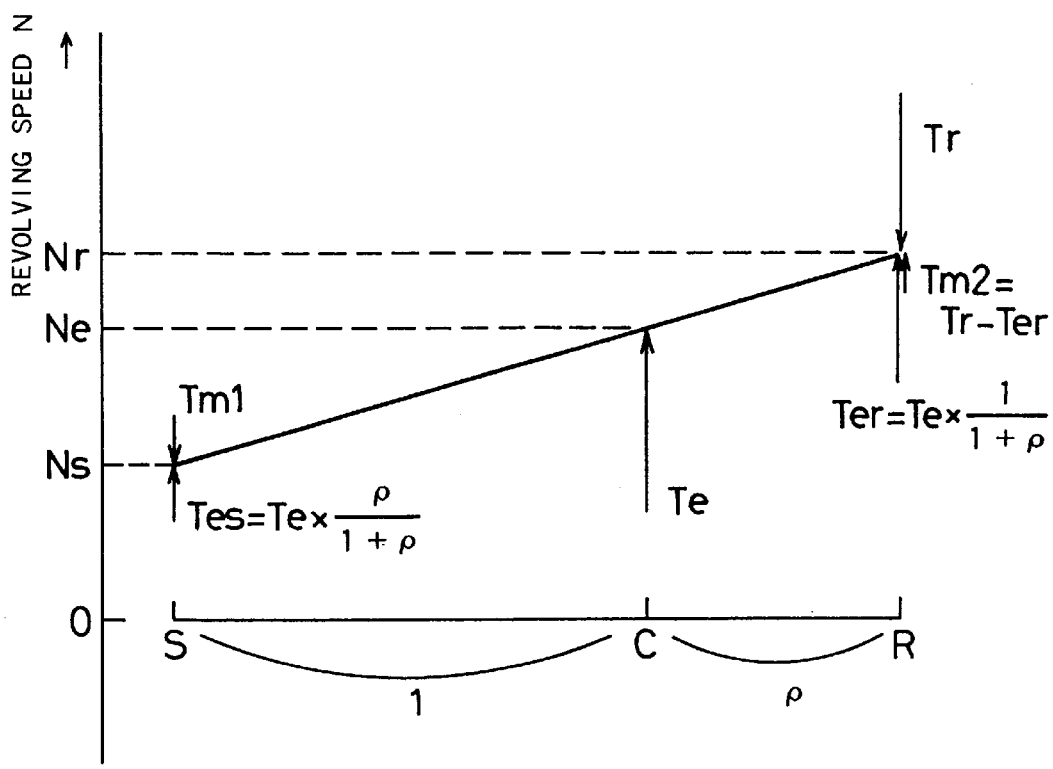
FIG. 5 is a nomogram showing the relationship between the revolving speed and the torque on the three shafts linked with the planetary gear 120 in the power output apparatus 110 of the embodiment.
Figure 6:
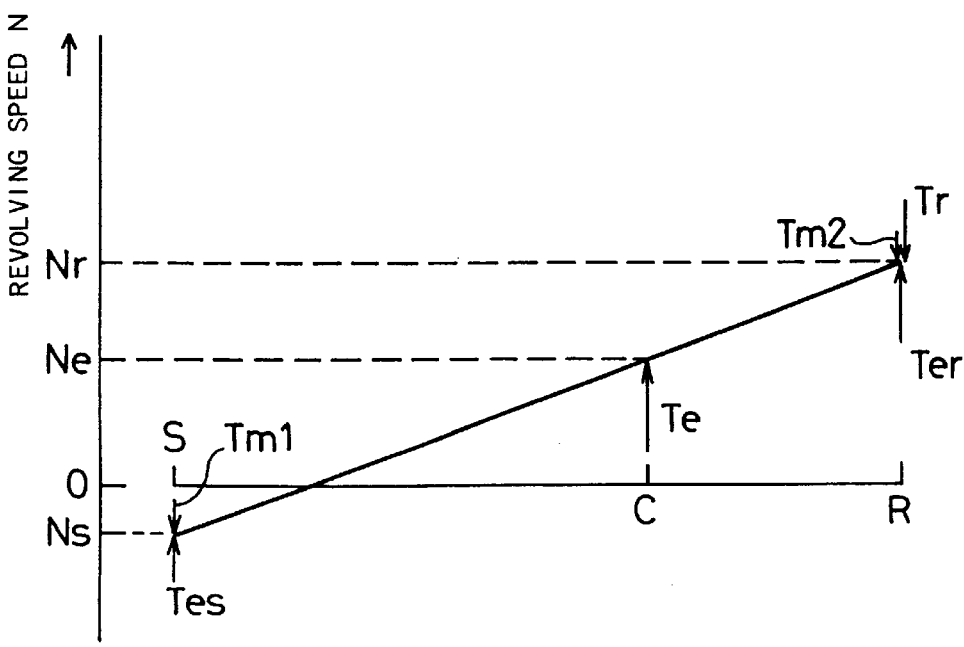
FIG. 6 is a nomogram showing the relationship between the revolving speed and the torque on the three shafts linked with the planetary gear 120 in the power output apparatus 110 of the embodiment.

According to the mechanics, the relationship between the revolving speed and the torque of the three shafts in the planetary gear 120 (that is, the sun gear shaft 125, the ring gear shaft 126, and the planetary carrier 124 (crankshaft 156)) can be expressed as nomograms illustrated in FIGS. 5 and 6 and solved geometrically. The relationship between the revolving speed and the torque of the three shafts in the planetary gear 120 may be analyzed numerically through calculation of energies of the respective shafts, without using the nomograms. For the clarity of explanation, the nomograms are used in this embodiment.

In the nomogram of FIG. 5, the revolving speed of the three shafts is plotted as ordinate and the positional ratio of the coordinate axes of the three shafts as abscissa. When a coordinate axis S of the sun gear shaft 125 and a coordinate axis R of the ring gear shaft 126 are positioned on either ends of a line segment, a coordinate axis C of the planetary carrier 124 is given as an interior division of the axes S and R at the ratio of 1 to ρ, where ρ represents a ratio of the number of teeth of the sun gear 121 to the number of teeth of the ring gear 122 and expressed as Equation (1) given below:

$$\rho = \frac{\text{the number of teeth of the sun gear}}{\text{the number of teeth of the ring gear}} \quad (1)$$

As mentioned above, the engine 150 is driven at the revolving speed Ne, while the ring gear shaft 126 is driven at the revolving speed Nr. The revolving speed Ne of the engine 150 can thus be plotted on the coordinate axis C of the planetary carrier 124 linked with the crankshaft 156 of the engine 150, and the revolving speed Nr of the ring gear shaft 126 on the coordinate axis R of the ring gear shaft 126. A straight line passing through both the points is drawn, and a revolving speed Ns of the sun gear shaft 125 is then given as the intersection of this straight line and the coordinate axis S. This straight line is hereinafter referred to as a dynamic collinear line. The revolving speed Ns of the sun gear shaft 125 can be calculated from the revolving speed Ne of the engine 150 and the revolving speed Nr of the ring gear shaft 126 according to a proportional expression given as Equation (2) below. In the planetary gear 120, the determination of the rotations of the two gears among the sun gear 121, the ring gear 122, and the planetary carrier 124 results in automatically setting the rotation of the residual one gear.

$$Ns = Nr - (Nr - Ne)1 + \frac{\rho}{\rho} \quad (2)$$

The torque Te of the engine 150 is then applied (upward in the drawing) to the dynamic collinear line on the coordinate axis C of the planetary carrier 124 functioning as a line of action. The dynamic collinear line against the torque can be regarded as a rigid body to which a force is applied as a vector. Based on the technique of dividing the force into two different parallel lines of action, the torque Te acting on the coordinate axis C is divided into a torque Tes on the coordinate axis S and a torque Ter on the coordinate axis R. The magnitudes of the torques Tes and Ter are given by Equations (3) and (4) below:

$$Tes = Te \times \frac{\rho}{1+\rho} \quad (3)$$

$$Ter = Te \times \frac{1}{1+\rho} \quad (4)$$

The equilibrium of forces on the dynamic collinear line is essential for the stable state of the dynamic collinear line. In accordance with a concrete procedure, a torque Tm1 having the same magnitude as but the opposite direction to the torque Tes is applied to the coordinate axis S, whereas a torque Tm2 having the same magnitude as but the opposite direction to a resultant force of the torque Ter and the torque that has the same magnitude as but the opposite direction to the torque Tr output to the ring gear shaft 126 is applied to the coordinate axis R. The torque Tm1 is given by the first motor MG1, and the torque Tm2 by the second motor MG2. The first motor MG1 applies the torque Tm1 in reverse of its rotation and thereby works as a generator to regenerate an electrical energy Pm1, which is given as the product of the torque Tm1 and the revolving speed Ns, from the sun gear shaft 125. The second motor MG2 applies the torque Tm2 in the direction of its rotation and thereby works as a motor to output an electrical energy Pm2, which is given as the product of the torque Tm2 and the revolving speed Nr, as a power to the ring gear shaft 126.

In case that the electrical energy Pm1 is identical with the electrical energy Pm2, all the electric power consumed by the second motor MG2 can be regenerated and supplied by the first motor MG1. In order to attain such a state, all the input energy should be output; that is, the energy Pe output from the engine 150 should be equal to an energy Pr output to the ring gear shaft 126. Namely the energy Pe expressed as the product of the torque Te and the revolving speed Ne is made equal to the energy Pr expressed as the product of the torque Tr and the revolving speed Nr. Referring to FIG. 4, the power that is expressed as the product of the torque Te and the revolving speed Ne and output from the engine 150 driven at the driving point P1 is subjected to torque conversion and output to the ring gear shaft 126 as the power of the same energy but expressed as the product of the torque Tr and the revolving speed Nr. As discussed previously, the power output to the ring gear shaft 126 is transmitted to a drive shaft 112 via the power feed gear 128 and the power transmission gear 111, and further transmitted to the driving wheels 116 and 118 via the differential gear 114. A linear relationship is accordingly held between the power output to the ring gear shaft 126 and the power transmitted to the driving wheels 116 and 118. The power transmitted to the driving wheels 116 and 118 can thus be controlled by adjusting the power output to the ring gear shaft 126.

Although the revolving speed Ns of the sun gear shaft 125 is positive in the nomogram of FIG. 5, it may be negative according to the revolving speed Ne of the engine 150 and the revolving speed Nr of the ring gear shaft 126 as shown in the nomogram of FIG. 6. In the latter case, the first motor MG1 applies the torque in the direction of its rotation and thereby works as a motor to consume the electrical energy Pm1 given as the product of the torque Tm1 and the revolving speed Ns. The second motor MG2, on the other hand, applies the torque in reverse of its rotation and thereby works as a generator to regenerate the electrical energy Pm2, which is given as the product of the torque Tm2 and the revolving speed Nr, from the ring gear shaft 126. In case that the electrical energy Pm1 consumed by the first motor MG1 is made equal to the electrical energy Pm2 regenerated by the second motor MG2 under such conditions, all the electric power consumed by the first motor MG1 can be supplied by the second motor MG2.

The above description refers to the fundamental torque conversion in the power output apparatus 110 of the embodiment. The power output apparatus 110 can, however, perform other operations as well as the above fundamental operation that carries out the torque conversion for all the power output from the engine 150 and outputs the converted torque to the ring gear shaft 126. The possible operations include an operation of charging the battery 194 with the surplus electrical energy and an operation of supplementing an insufficient electrical energy with the electric power stored in the battery 194. These operations are implemented by regulating the power output from the engine 150 (that is, the product of the torque Te and the revolving speed Ne), the electrical energy Pm1 regenerated. or consumed by the first motor MG1, and the electrical energy Pm2 regenerated or consumed by the second motor MG2.

The operation principle discussed above is on the assumption that the efficiency of power conversion by the planetary gear 120, the motors MG1 and MG2, and the transistors Tr1 through Tr16 is equal to the value '1', which represents 100%. In the actual state, however, the conversion efficiency is less than the value '1', and it is required to make the energy Pe output from the engine 150 a little greater than the energy Pr output to the ring gear shaft 126 or alternatively to make the energy Pr output to the ring gear shaft 126 a little smaller than the energy Pe output from the engine 150. By way of example, the energy Pe output from the engine 150 may be calculated by multiplying the energy Pr output to the ring gear shaft 126 by the reciprocal of the conversion efficiency. In the state of the nomogram of FIG. 5, the torque Tm2 of the second motor MG2 may be calculated by multiplying the electric power regenerated by the first motor MG1 by the efficiencies of both the motors MG1 and MG2. In the state of the nomogram of FIG. 6, on the other hand, the torque Tm2 of the second motor MG2 may be calculated by dividing the electric power consumed by the first motor MG1 by the efficiencies of both the motors MG1 and MG2. In the planetary gear 120, there is an energy loss or heat loss due to a mechanical friction or the like, though the amount of energy loss is significantly small, compared with the whole amount of energy concerned. The efficiency of the synchronous motors used as the first and the second motors MG1 and MG2 is very close to the value '1'. Known devices such as GTOs applicable to the transistors Tr1 through Tr16 have extremely small ON-resistance. The efficiency of power conversion is thus practically equal to the value '1'. For the matter of convenience, in the following discussion of the embodiment, the efficiency is considered equal to the value '1' (=100%), unless otherwise specified.

Figure 7:
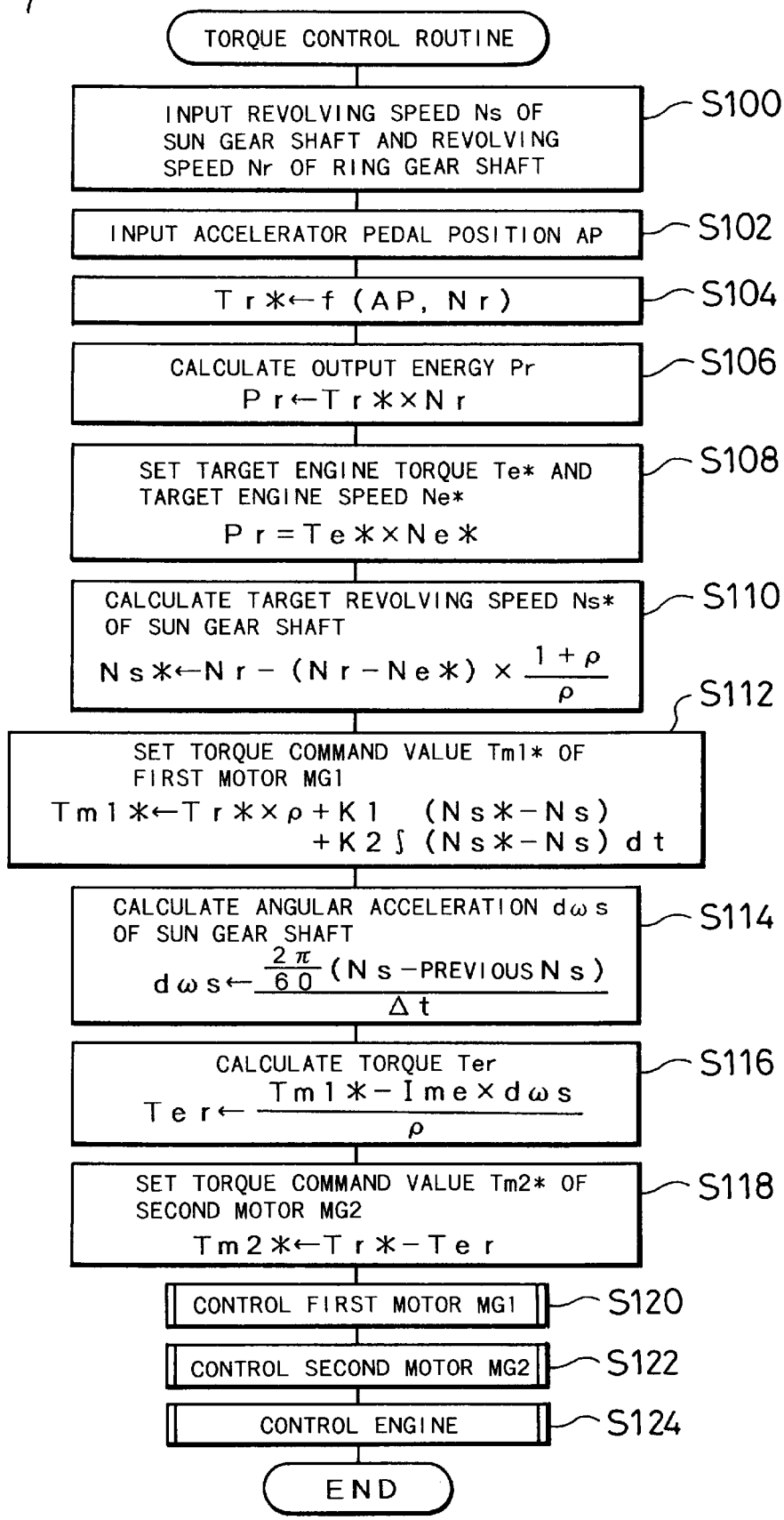
FIG. 7 is a flowchart showing a torque control routine executed by the controller 180 of the embodiment.

The power output apparatus 110 of the embodiment thus constructed carries out torque control, which follows a torque control routine shown in the flowchart of FIG. 7. The torque control routine is executed repeatedly at predetermined time intervals (for example, at every 4 msec) after the driver gives a drive start instruction, for example, by turning on an ignition switch (not shown). When the program enters the routine of FIG. 7, the control CPU 190 of the controller 180 first reads the revolving speed Ns of the sun gear shaft 125 and the revolving speed Nr of the ring gear shaft 126 at step S100. The revolving speed Ns of the sun gear shaft 125 may be calculated from the rotational angle θs of the sun gear shaft 125 read from the resolver 139, whereas the revolving speed Nr of the ring gear shaft 126 may be calculated from the rotational angle θr of the ring gear shaft 126 read from the resolver 149.

Figure 8:
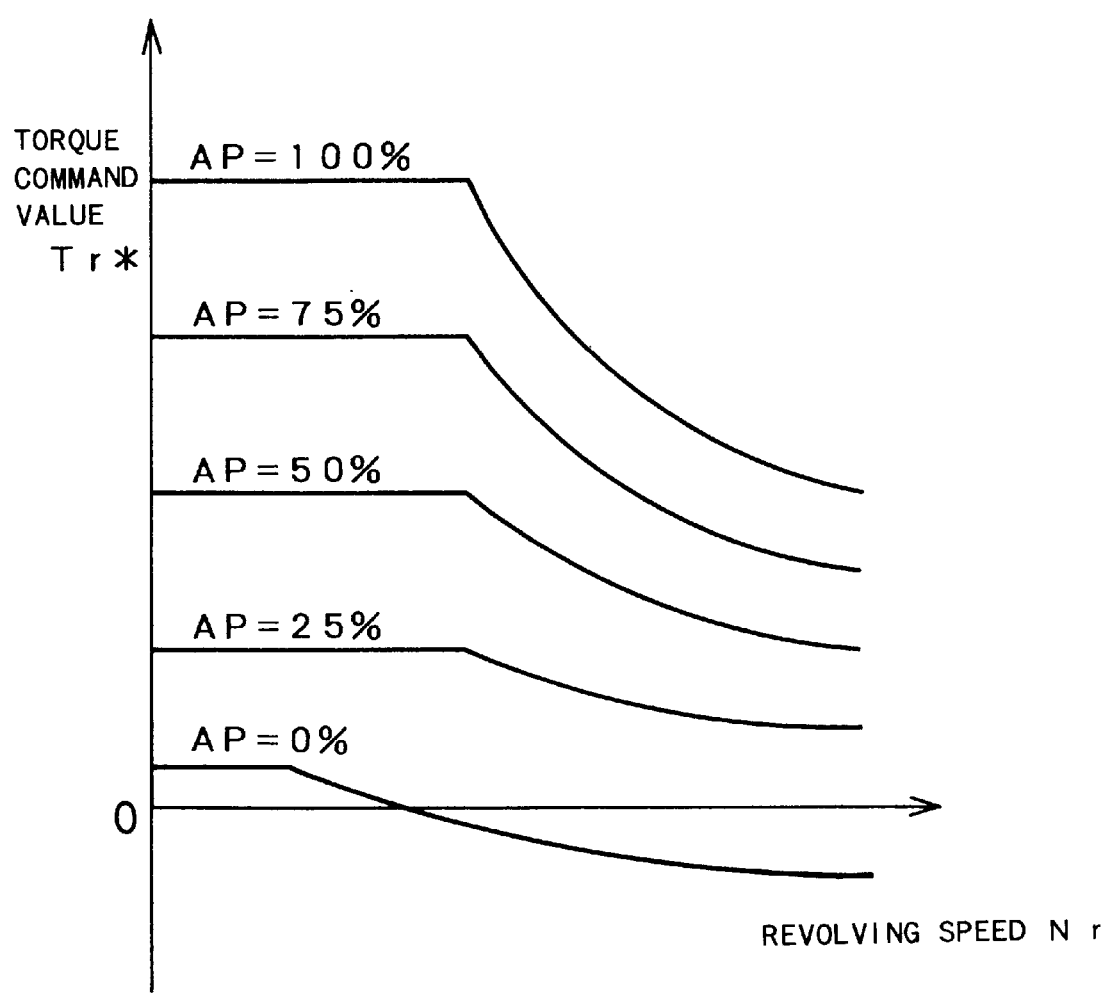
FIG. 8 shows the relationship between the revolving speed Nr of the ring gear shaft 126, the accelerator pedal position AP, and the torque command value Tr*.

The control CPU 190 then reads the accelerator pedal position AP detected by the accelerator pedal position sensor 164a at step S102. The driver steps on the accelerator pedal 164 when feeling an insufficiency of the output torque. The value of the accelerator pedal position AP accordingly represents the desired torque to be output to the ring gear shaft 126 and eventually to the driving wheels 116 and 118. The control CPU 190 subsequently determines a torque command value Tr*, that is, a target torque to be output to the ring gear shaft 126, based on the input revolving speed Nr of the ring gear shaft 126 and the input accelerator pedal position AP at step S104. Not the torque to be output to the driving wheels 116 and 118 but the torque to be output to the ring gear shaft 126 is calculated here from the accelerator pedal position AP and the revolving speed Nr. This is because the ring gear shaft 126 is mechanically linked with the driving wheels 116 and 118 via the power feed gear 128, the power transmission gear 111, and the differential gear 114 and the determination of the torque to be output to the ring gear shaft 126 thus results in determining the torque to be output to the driving wheels 116 and 118. In this embodiment, a map representing the relationship between the torque command value Tr*, the revolving speed Nr of the ring gear shaft 126, and the accelerator pedal position AP is prepared in advance and stored in the ROM 190b. In accordance with a concrete procedure, at step S104, the torque command value Tr* corresponding to the input accelerator pedal position AP and the input revolving speed Nr of the ring gear shaft 126 is read from the map stored in the ROM 190b. An example of available maps is shown in FIG. 8.

The control CPU 190 then calculates an amount of energy Pr to be output to the ring gear shaft 126 from the torque command value Tr* obtained at step S104 and the input revolving speed Nr of the ring gear shaft 126 (Pr=Tr*×Nr) at step S106, and sets a target torque Te* and a target revolving speed Ne* of the engine 150 based on the calculated amount of energy Pr at step S108. Since the energy Pe output from the engine 150 is defined as the product of the torque Te and the revolving speed Ne, the energy Pr to be output to the ring gear shaft 126 and the target torque Te* and the target revolving speed Ne* of the engine 150 satisfy the relationship of Pr=Pe=Te*×Ne*. There are, however, numerous combinations of the target torque Te* and the target revolving speed Ne* of the engine 150 satisfying the above relationship. In this embodiment, favorable combinations of the target engine torque Te* and the target engine speed Ne* are experimentally or otherwise determined in advance for the respective amounts of energy Pr and stored as a map in the ROM 190b. The favorable combinations represent the driving points that enable the engine 150 to be driven at the highest possible efficiency and that smoothly vary the driving state of the engine 150 with a variation in amount of energy Pr. In accordance with a concrete procedure, at step S108, the combination of the target engine torque Te* and the target engine speed Ne* corresponding to the calculated amount of energy Pr is read from the map stored in the ROM 190b. The following gives a further description of the map.

Figure 9:
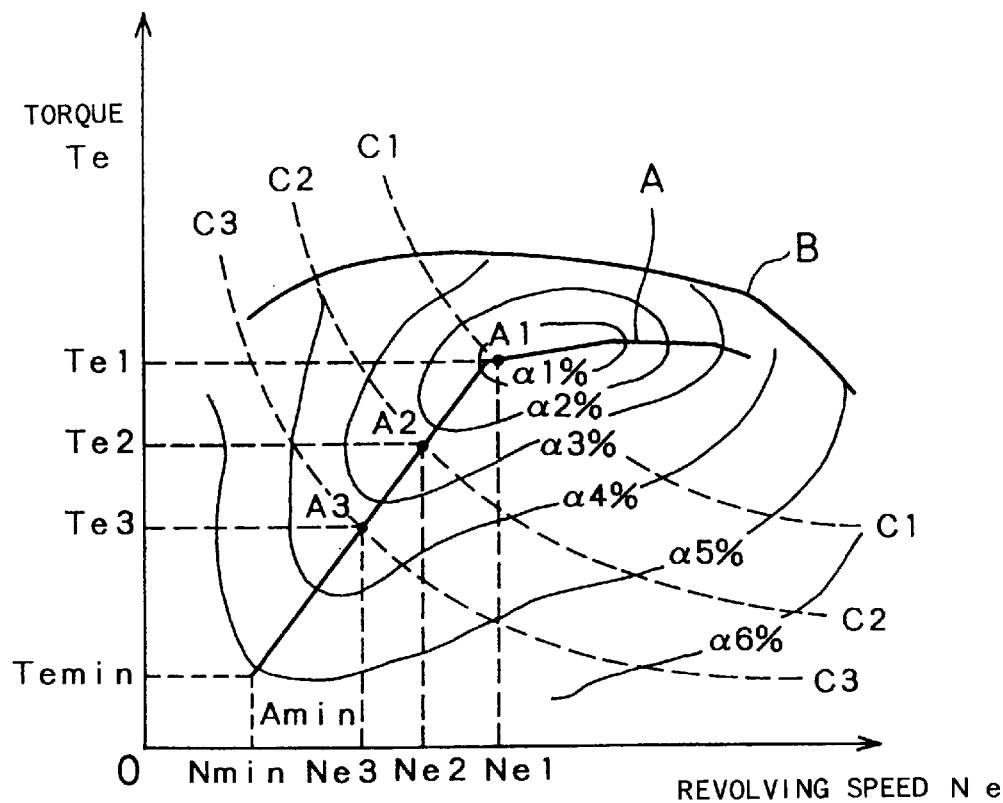
FIG. 9 is a graph illustrating the relationship between the driving point and the efficiency of the engine.

FIG. 9 is a graph showing the relationship between the driving point of the engine 150 (defined by the engine torque Te and the engine speed Ne) and the efficiency of the engine 150. The curve B in FIG. 9 represents a boundary of an engine-operable range, in which the engine 150 can be driven. In the engine-operable range, efficiency curves, such as curves α1 through α6, can be drawn by successively joining the driving points having the identical efficiency. In the engine-operable range, constant energy curves expressed as the product of the torque Te and the revolving speed Ne, such as curves C1—C1 through C3—C3, can also be drawn. The graph of FIG. 10 shows the efficiency of the respective driving points along the constant energy curves C1—C1 through C3—C3 plotted against the revolving speed Ne of the engine 150.

Figure 10:
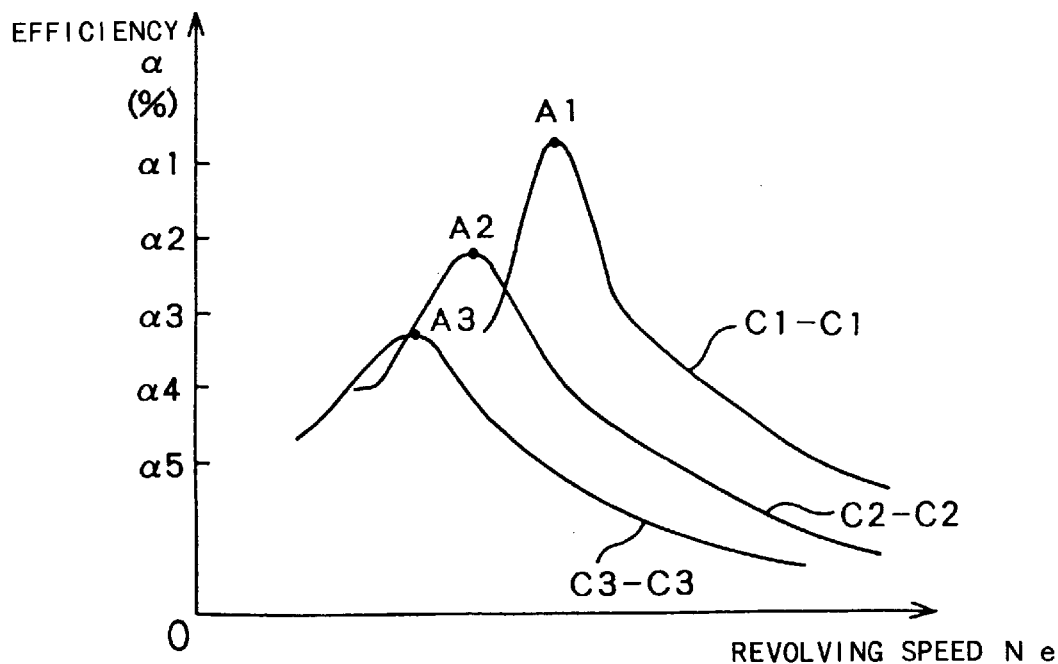
FIG. 10 is a graph showing the efficiencies of the engine 150 at various driving points along the constant-output energy curves, which are plotted against the revolving speed Ne of the engine 150.

Referring to FIG. 10, the efficiency of the engine 150 with respect to the same output energy is significantly varied by the driving point of the engine 150. On the constant energy curve C1—C1, for example, the efficiency of the engine 150 reaches its maximum when the engine 150 is driven at a driving point A1 (torque Te1 and revolving speed Ne1). Such a driving point attaining the highest possible efficiency exists on each constant energy curve; a driving point A2 for the constant energy curve C2—C2 and a driving point A3 for the constant energy curve C3—C3. The curve A in FIG. 9 is obtained by joining such driving points attaining the highest possible efficiency of the engine 150 for the respective amounts of energy Pr by a continuous curve. In this embodiment, the map representing the relationship between each driving point (torque Te and revolving speed Ne) on the curve A and the amount of energy Pr is used at step S108 in the flowchart of FIG. 7 for setting the target torque Te* and the target revolving speed Ne* of the engine 150.

The curve A should be continuous because of the following reason. In case that discontinuous curves are used to set the driving points of the engine 150 against a variation in amount of energy Pr, the driving state of the engine 150 is abruptly varied with a variation in amount of energy Pr crossing over the discontinuous driving points. The abrupt variation may prevent the driving state from being smoothly shifted to a target level, thereby knocking or even stopping the vehicle. Each driving point on the continuous curve A may accordingly not correspond to the driving point attaining the highest possible efficiency on the constant energy curve. In the drawing of FIG. 9, a driving point Amin defined by a torque Temin and a revolving speed Nemin represents a driving point of minimum energy that can be output from the engine 150.

After setting the target torque Te* and the target revolving speed Ne* of the engine 150, the control CPU 190 substitutes the target revolving speed Ne* of the engine 150 for the revolving speed Ne of the engine 150 in Equation (2) given above, so as to calculate a target revolving speed Ns* of the sun gear shaft 125 at step S110. The control CPU 190 then calculates a torque command value Tm1* of the first motor MG1 from the calculated target revolving speed Ns* of the sun gear shaft 125 and the torque command value Tr* obtained at step S104 according to Equation (5) given below at step S112. The first term on the right side of Equation (5) is obtained from the equilibrium on the dynamic collinear line shown in the nomograms of FIGS. 5 and 6. The second term on the right side is a proportional term to cancel the deviation of the actual revolving speed Ns from the target revolving speed Ns*, and the third term on the right side is an integral term to cancel the stationary deviation. In the stationary state (that is, when the deviation of the revolving speed Ns from the target revolving speed Ns* is equal to zero), the torque command value Tm1* of the first motor MG1 is set equal to the first term on the right side Tr*×ρ obtained from the equilibrium on the dynamic collinear line. K1 and K2 in Equation (5) denote proportional constants.

$$Tm1^* \leftarrow Tr^* \times \rho + K1(Ns^* - Ns) + K2 \int (Ns^* - Ns)dt \quad (5)$$

The control CPU 190 then calculates a rate of change of the revolving speed of the sun gear shaft 125 or an angular acceleration dωs from the revolving speed Ns of the sun gear shaft 125 according to Equation (6) given below at step S114. In Equation (6), the 'previous Ns' represents the revolving speed Ns of the sun gear shaft 125 input at step S100 when this routine was carried out last time, and Δt denotes an interval between the respective cycles of this routine. '2π' in the numerator on the right side of Equation (6) is based on the fact that the angular velocity ωs and the revolving speed Ns of the sun gear shaft 125 satisfy the relationship of ωs =2π×Ns [rad/sec]. When this routine is carried out for the first time after the driver has turned on the ignition switch, the value '0' is input to the previous Ns by an initialization routine (not shown) carried out prior to this routine.

$$d\omega s \leftarrow \frac{\frac{2\pi}{60}(Ns - PreviousNs)}{\Delta t} \quad (6)$$

The control CPU 190 calculates the torque Ter output to the ring gear shaft 126 via the planetary gear 120 from the angular acceleration dωs of the sun gear shaft 125 according to Equation (7) given below at step S116. 'Ime' in the second term of the numerator on the right side of Equation (7) represents a moment of inertia of the first motor MG1 and the engine 150, which is seen from the first motor MG1 of an inertial system consisting of the first motor MG1 and the engine 150 that are mechanically linked with each other via the planetary gear 120. The product of the moment of inertial Ime seen from the first motor MG1 and the angular acceleration dgs of the rotor 132 of the first motor MG1 accordingly represents a torque acting on the sun gear shaft 125 (hereinafter referred to as the inertial torque). The numerator on the right side of Equation (7) thus represents a resultant torque acting on the sun gear shaft 125. The inertial torque acts in reverse of the variation in motion by the law of inertia. In case that the driving state of the engine 150 has been changed to a driving point of greater revolving speed Ne, the inertial torque acts to depress the increase in revolving speed Ne. The inertial torque accordingly has a negative value in the calculation of the torque Ter applied to the ring gear shaft 126. In case that the driving state of the engine 150 has been changed to a driving point of smaller revolving speed Ne, on the other hand, the inertial torque acts to depress the decrease in revolving speed Ne. When the engine 150 is in the stationary driving state, the angular acceleration dωs of the sun gear shaft 125 is equal to zero and the inertial torque is thereby also equal to zero.

$$Ter = \frac{Tm1^* - Ime \times d\omega s}{\rho} \qquad (7)$$

After the calculation of the torque Ter output to the ring gear shaft 126 via the planetary gear 120, the control CPU 190 subtracts the calculated torque Ter from the torque command value Tr* to set a torque command value Tm2* of the second motor MG2 at step S118. The program subsequently controls the first motor MG1, the second motor MG2, and the engine 150 based on the preset values at steps S120 through S124. As a matter of convenience of illustration, the control operations of the first motor MG1, the second motor MG2, and the engine 150 are shown as separate steps. In the actual procedure, however, these control operations are carried out in parallel and comprehensively. By way of example, the control CPU 190 simultaneously controls the first motor MG1 and the second motor MG2 by utilizing an interrupting process, while transmitting an instruction to the EFIECU 170 through communication in order to allow the EFIECU 170 to control the engine 150 concurrently.

Figure 11:
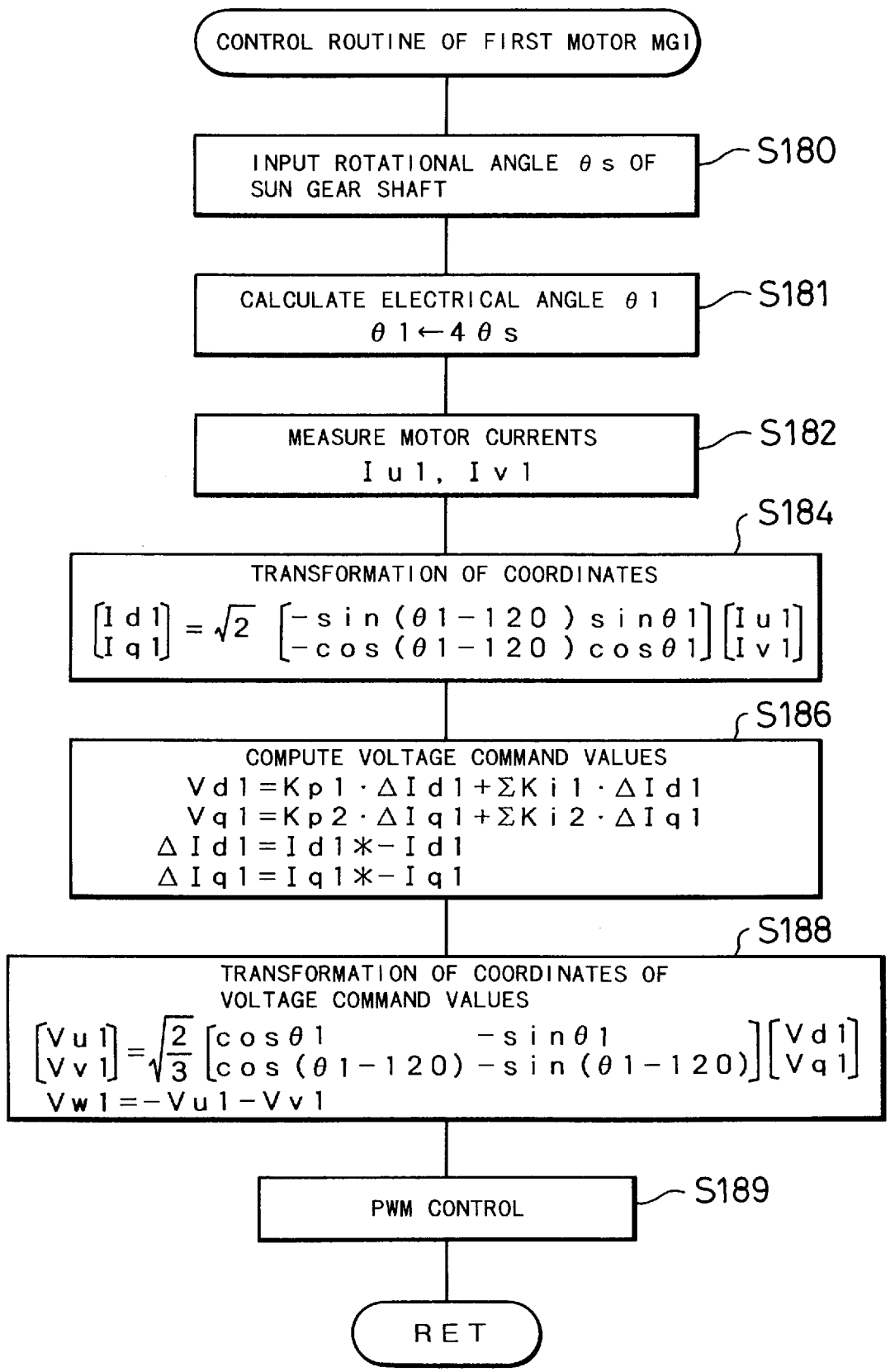
FIG. 11 is a flowchart showing a control routine of the first motor MG1 executed by the control CPU 190 of the controller 180.

The control operation of the first motor MG1 (step S120 in the flowchart of FIG. 7) follows the control routine of the first motor MG1 shown in the flowchart of FIG. 11. When the program enters the routine of FIG. 11, the control CPU 190 of the controller 180 first receives the rotational angle θs of the sun gear shaft 125 from the resolver 139 at step S180, and calculates an electrical angle θ1 of the first motor MG1 from the rotational angle θs of the sun gear shaft 125 at step S181. In this embodiment, since a synchronous motor of four-pole pair (that is, four N poles and four S poles) is used as the first motor MG1, the rotational angle θs of the sun gear shaft 125 is quadrupled to yield the electrical angle θ1 (θ1=4θs). The CPU190 then detects values of currents Iu1 and Iv1 flowing through the U phase and V phase of the three-phase coils 134 in the first motor MG1 with the ammeters 195 and 196 at step S182. Although the currents naturally flow through all the three phases U, V, and W, measurement is required only for the currents passing through the two phases since the sum of the currents is equal to zero. At subsequent step S184, the control CPU 190 executes transformation of coordinates (three-phase to two-phase transformation) using the values of currents flowing through the three phases obtained at step S182. The transformation of coordinates maps the values of currents flowing through the three phases to the values of currents passing through d and q axes of the permanent magnet-type synchronous motor and is executed according to Equation (8) given below. The transformation of coordinates is carried out because the currents flowing through the d and q axes are essential for the torque control in the permanent magnet-type synchronous motor. Alternatively, the torque control may be executed directly with the currents flowing through the three phases.

$$\begin{bmatrix} Id1 \\ Iq1 \end{bmatrix} = \sqrt{2} \begin{bmatrix} -\sin(\theta1 - 120) & \sin\theta1 \\ -\cos(\theta1 - 120) & \cos\theta1 \end{bmatrix} \begin{bmatrix} Iu1 \\ Iv1 \end{bmatrix} \qquad (8)$$

After the transformation to the currents of two axes, the control CPU 190 computes deviations of currents Id1 and Iq1 actually flowing through the d and q axes from current command values Id1* and Iq1* of the respective axes, which are calculated from the torque command value Tm1* of the first motor MG1, and subsequently determines voltage command values Vd1 and Vq1 with respect to the d and q axes at step S186. In accordance with a concrete procedure, the control CPU 190 executes arithmetic operations of Equations (9) and Equations (10) given below. In Equations (10), Kp1, Kp2, Ki1, and Ki2 represent coefficients, which are adjusted to be suited to the characteristics of the motor applied. Each voltage command value Vd1 (Vq1) includes a part in proportion to the deviation ΔI from the current command value I* (the first term on the right side of Equation (10)) and a summation of historical data of the deviations ΔI for 'i' times (the second term on the right side).

ΔId1=Id1*−Id1

ΔIq1=Iq1*−Iq1 (9)

Vd1=Kp1·ΔId1+ΣKi1·ΔId1

Vq1=Kp2·ΔIq1+ΣKi2·ΔIq1 (10)

The control CPU 190 then re-transforms the coordinates of the voltage command values thus obtained (two-phase to three-phase transformation) at step S188. This corresponds to an inverse of the transformation executed at step S184. The inverse transformation determines voltages Vu1, Vv1, and Vw1 actually applied to the three-phase coils 134 as expressed by Equations (11) given below:

$$\begin{bmatrix} Vu1 \\ Vv1 \end{bmatrix} = \sqrt{\frac{2}{3}} \begin{bmatrix} \cos\theta1 & -\sin\theta1 \\ \cos(\theta1 - 120) & -\sin(\theta1 - 120) \end{bmatrix} \begin{bmatrix} Vd1 \\ Vq1 \end{bmatrix} \qquad (11)$$

$$Vw1 = -Vu1 - Vv1$$

The actual voltage control is accomplished by on-off operation of the transistors Tr1 through Tr6 in the first driving circuit 191. At step S189, the on- and off-time of the transistors Tr1 through Tr6 in the first driving circuit 191 is PWM (pulse width modulation) controlled, in order to attain the voltage command values Vu1, Vv1, and Vw1 determined by Equations (11) given above.

It is assumed that the torque command value Tm1* of the first motor MG1 is positive when the torque Tm1 is applied in the direction shown in the nomograms of FIGS. 5 and 6.

For an identical positive torque command value Tm1*, the first motor MG1 is controlled to carry out the regenerative operation when the torque command value Tm1* acts in reverse of the rotation of the sun gear shaft 125 as in the state of the nomogram of FIG. 5, and controlled to carry out the power operation when the torque command value Tm1* acts in the direction of rotation of the sun gear shaft 125 as in the state of the nomogram of FIG. 6. For the positive torque command value Tm1*, both the regenerative operation and the power operation of the first motor MG1 implement the identical switching control. In accordance with a concrete procedure, the transistors Tr1 through Tr6 in the first driving circuit 191 are controlled to enable a positive torque to be applied to the sun gear shaft 125 by the combination of the magnetic field generated by the permanent magnets 135 set on the outer surface of the rotor 132 with the revolving magnetic field generated by the currents flowing through the three-phase coils 134. The identical switching control is executed for both the regenerative operation and the power operation of the first motor MG1 as long as the sign of the torque command value Tm1* is not changed. The control routine of the first motor MG1 shown in the flowchart of FIG. 11 is thus applicable to both the regenerative operation and the power operation. When the torque command value Tm1* is negative, the rotational angle θs of the sun gear shaft 125 read at step S180 is varied in a reverse direction. The control routine of the first motor MG1 shown in FIG. 11 is thus also applicable to this case.

Even when the torque command value Tm1* of the first motor MG1 is set equal to zero, the first motor MG1 can be controlled according to the control routine of the first motor MG1 in FIG. 11. In this case, however, the operation of turning off all the transistors Tr1 through Tr6 can exert the same effects.

Figure 12:
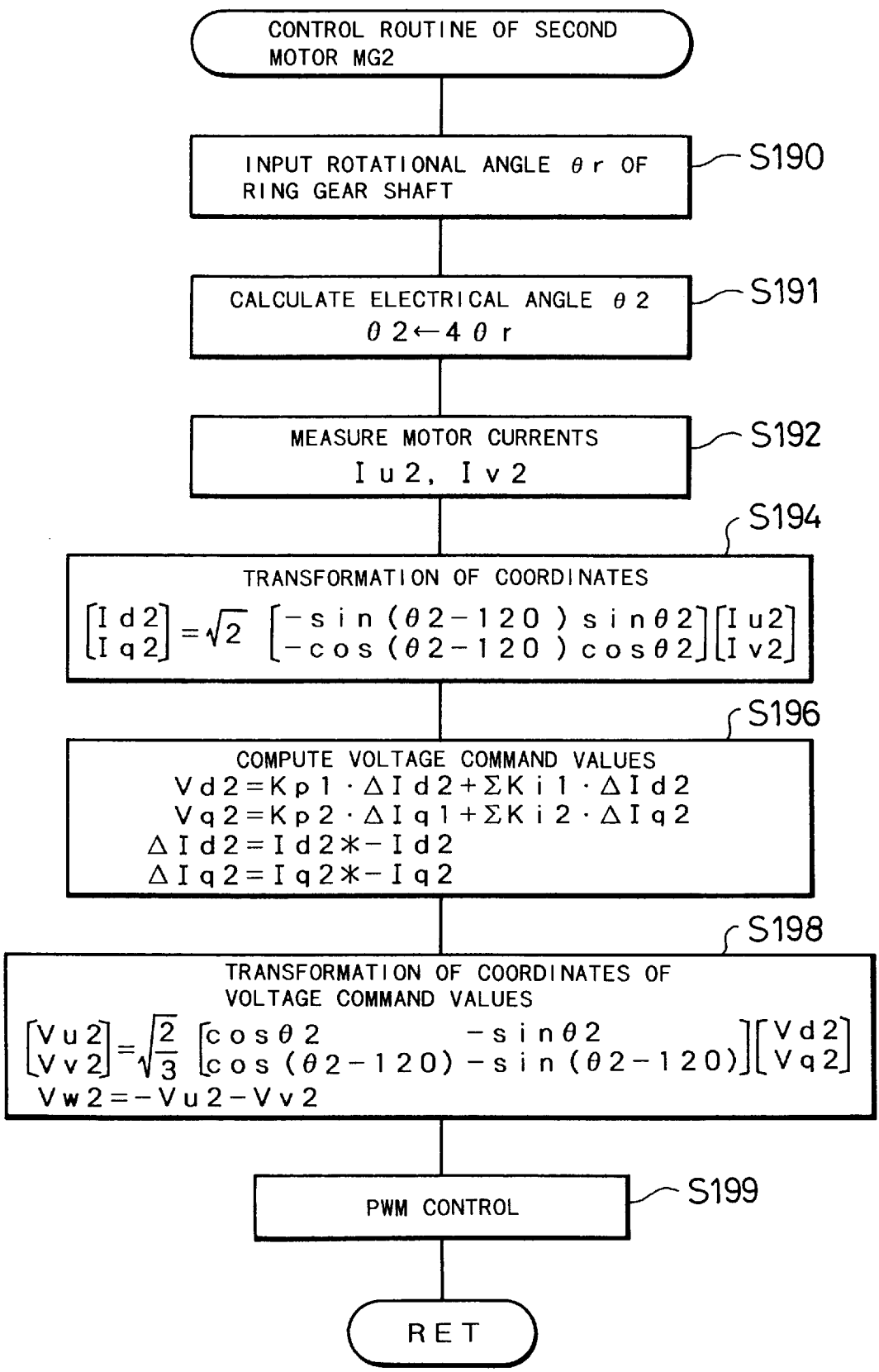
FIG. 12 is a flowchart showing a control routine of the second motor MG2 executed by the control CPU 190 of the controller 180.

The control operation of the second motor MG2 (step S122 in the flowchart of FIG. 7) follows the control routine of the second motor MG2 shown in the flowchart of FIG. 12. The control procedure of the second motor MG2 is identical with that of the first motor MG1, except that the torque command value Tm2* and the rotational angle θr of the ring gear shaft 126 are used in place of the torque command value Tm1* and the rotational angle θs of the sun gear shaft 125. When the program enters the routine of FIG. 12, the control CPU 190 of the controller 180 first receives the rotational angle θr of the ring gear shaft 126 from the revolver 149 at step S190, and calculates an electrical angle θ2 of the second motor MG2 from the observed rotational angle θr of the ring gear shaft 126 at step S191. At subsequent step S192, phase currents Iu2 and Iv2 of the second motor MG2 are measured with the ammeters 197 and 198. The control CPU 190 then executes transformation of coordinates for the phase currents at step S194, computes voltage command values Vd2 and Vq2 at step S196, and executes inverse transformation of coordinates for the voltage command values at step S198. The control CPU 190 subsequently determines the on- and off-time of the transistors Tr11 through Tr16 in the second driving circuit 192 for the second motor MG2 and carries out the PWM control at step S199. Since the second motor MG2 is a synchronous motor of four-pole pair like the first motor MG1, the rotational angle θr of the ring gear shaft 126 is quadrupled to yield the electrical angle θ2 (θ2=4θr).

The second motor MG2 is also controlled to carry out either the regenerative operation or the power operation, based on the relationship between the direction of the torque command value Tm2* and the direction of the rotation of the ring gear shaft 126. Like the first motor MG1, the control process of the second motor MG2 shown in the flowchart of FIG. 12 is applicable to both the regenerative operation and the power operation. In this embodiment, it is assumed that the torque command value Tm2* of the second motor MG2 is positive when the torque Tm2 is applied in the direction shown in the nomogram of FIG. 5.

The control operation of the engine 150 (step S124 in the flowchart of FIG. 7) is executed in the following manner. The torque Te and the revolving speed Ne of the engine 150 are regulated to enable the engine 150 to be kept in a stationary driving state at the preset driving point defined by the target engine torque Te* and the target engine speed Ne*. In accordance with a concrete procedure, the control CPU 190 transmits an instruction to the EFIECU 170 through communication, and the EFIECU 70 regulates the amount of fuel injection from the fuel injection valve 151 and the position of the throttle valve 166, thereby enabling the output torque and the revolving speed of the engine 150 to gradually approach to the target engine torque Te* and the target engine speed Ne*. As shown by Equation (5) given above, the revolving speed Ne of the engine 150 is controlled by regulating the revolving speed Ns of the sun gear shaft 125 by means of the first motor MG1. The control operation of the engine 150 accordingly includes regulation of the throttle valve 166 and regulation of the air/fuel ratio with respect to the amount of intake air, in order to enable the engine 150 to output the target torque Te*. In response to an engine operation stop instruction output from the control CPU 190, the EFIECU 170 stops fuel injection from the fuel injection valve 151 and application of a voltage to the ignition plug 162 and fully closes the throttle valve 166.

As discussed above, the power output apparatus 110 of the embodiment calculates the inertial torque required for varying the driving point when the driving point of the engine 150 has been changed, calculates the torque command value Tm2* of the second motor MG2 by taking into account the inertial torque, and drives the second motor MG2. This structure enables the desired torque to be output to the ring gear shaft 126 and eventually to the driving wheels 116 and 118 even in the transient time while the driving point of the engine 150 is being changed. When the engine 150 is in the stationary driving state, the angular acceleration dωs of the sun gear shaft 125 is equal to zero. The torque Ter output to the ring gear shaft 126 via the planetary gear 120 is accordingly obtained from the equilibrium on the dynamic collinear line in the nomograms of FIGS. 5 and 6, so that the desired torque can be output to the ring gear shaft 126. This structure enables the ring gear shaft 126 to have a smooth transient characteristic without any significant torque shock.

The power output apparatus 110 of the embodiment can convert the energy Pe output from the engine 150 to a power defined by desired torque and revolving speed and then output to the ring gear shaft 126.

Figure 13:
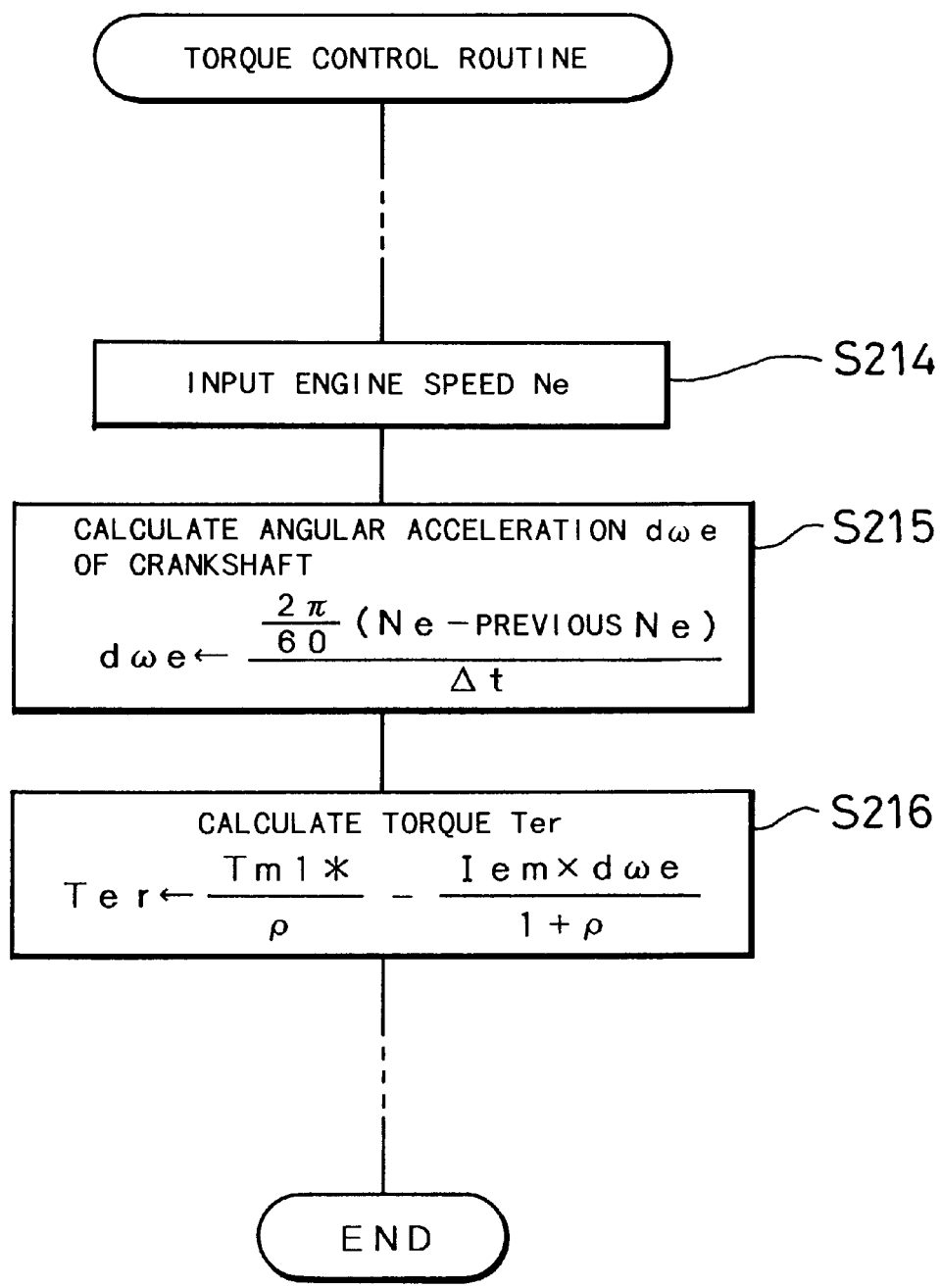
FIG. 13 is a flowchart showing part of a modified torque control routine.

The power output apparatus 110 of the embodiment calculates the angular acceleration dωs of the sun gear shaft 125, calculates the inertial torque acting on the sun gear shaft 125 by multiplying the angular acceleration dωs by the moment of inertia seen from the first motor MG1 of the inertial system consisting of the first motor MG1 and the engine 150, and thereby determines the torque Ter output to the ring gear shaft 126 via the planetary gear 120. Another possible structure may calculate an angular acceleration dωe of the crankshaft 156, calculate an inertial torque acting on the crankshaft 156 by multiplying the angular acceleration dωe by the moment of inertia seen from the engine 150 of the inertial system consisting of the first motor MG1 and the engine 150, and thereby determine the torque Ter based on the calculated inertial torque. In this case, for example, the processing of steps S114 and S116 in the torque control routine of FIG. 7 may be replaced by the processing of steps S214 through S216 in a modified torque control routine shown in the flowchart of FIG. 13. In this modified torque control routine, the control CPU 190 reads the revolving speed Ne of the engine 150 at step S214, calculates the angular acceleration dωe of the crankshaft 156 from the input revolving speed Ne according to an equation equivalent to Equation (6) at step S215, and calculates the torque Ter from the angular acceleration dωe according to Equation (12) given below at step S216. 'Iem' in the second term on the right side of Equation (12) represents a moment of inertia of the first motor MG1 and the engine 150, which is seen from the engine 150 of the inertial system consisting of the first motor MG1 and the engine 150 that are mechanically linked with each other via the planetary gear 120. The revolving speed Ne of the engine 150 may be calculated from the revolving speed Ns of the sun gear shaft 125 and the revolving speed Nr of the ring gear shaft 126 according to Equation (2) rewritten to a suitable form. The revolving speed Ne of the engine 150 may alternatively be calculated from the rotational angle of the crankshaft 156 measured with a resolver attached to the crankshaft 156. The revolving speed Ne of the engine 150 may otherwise be input as a signal, which is detected by the speed sensor 176 attached to the distributor 160, through communication from the EFIECU 170.

$$Ter \leftarrow \frac{Tm1^*}{\rho} - \frac{Iem \times d\omega e}{1+\rho} \quad (12)$$

The power output apparatus 110 of the embodiment sets the target torque Te* and the target revolving speed Ne* of the engine 150 based on the energy Pr to be output to the ring gear shaft 126, and supplies the energy Pr with the energy Pe output from the engine 150. Another possible structure may supply part of the energy Pr to be output to the ring gear shaft 126 with the electrical energy discharged from the battery 194 or enable the engine 150 to output the energy Pe greater than the energy Pr, thereby allowing the battery 194 to be charged with the surplus energy. In this case, the equation used for the calculation at step S108 in the torque control routine of FIG. 7 is replaced by Equation (13) given below. 'Pb' in Equation (13) denotes an electrical energy, which the battery 194 is charged with or which is discharged from the battery 194. Pb has a positive value at the time of charging the battery 194 and has a negative value at the time of discharging the battery 194. This structure enables the desired torque to be stably output to the ring gear shaft 126 while charging or discharging the battery 194.

$$Pr+Pb=Te^* \times Ne^* \quad (13)$$

In the power output apparatus 110 of the embodiment, the torque control routine of FIG. 7 is applied to the transient time while the engine 150 is continuously driven and the driving point of the engine 150 is being changed. The torque control routine of FIG. 7 is also applicable to the transient time while the operation of the engine 150 is being stopped. In this case, the target engine torque Te* and the target engine speed Ne* are set equal to zero. The operation of the engine 150 is stopped, for example, when the energy Pr to be output to the ring gear shaft 126 is smaller than the minimum energy Pe that can be output from the engine 150 (that is, the energy Pe at the driving point Amin defined by the torque Temin and the revolving speed Nemin in the drawing of FIG. 9) or when the driver gives an instruction to stop the engine 150 for the purpose of protecting the environment.

In the power output apparatus 110 of the embodiment, the target engine torque Te* and the target engine speed Ne* are set to enhance the efficiency of the engine 150. The target engine torque Te* and the target engine speed Ne* may, however, be set to improve the emission or reduce the noise of the engine 150.

Figure 14:
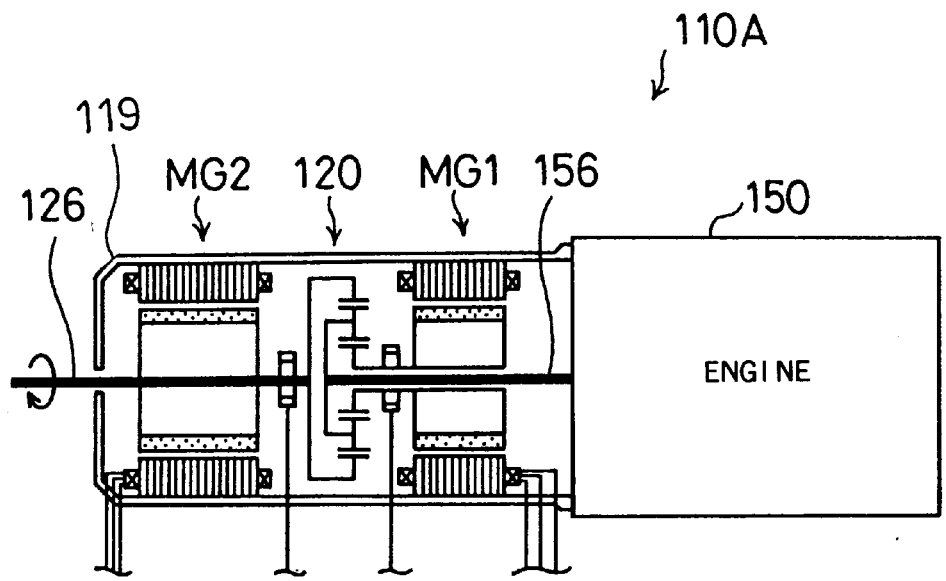
FIG. 14 schematically illustrates another power output apparatus 110A as a modified example.
Figure 15:
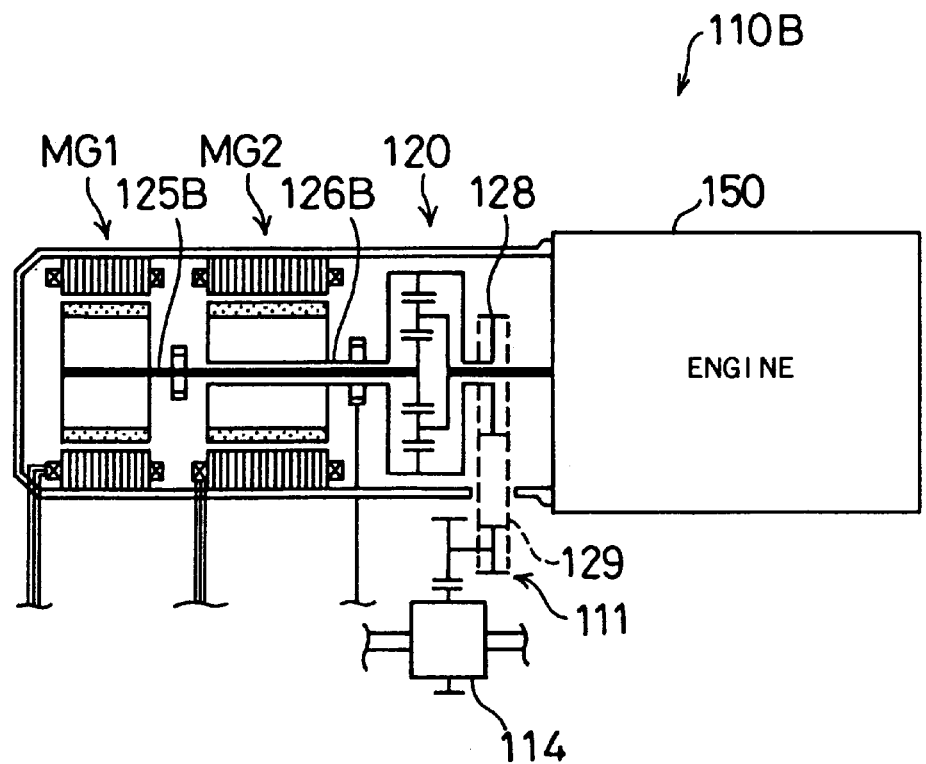
FIG. 15 schematically illustrates still another power output apparatus 110B as another modified example.

In the power output apparatus 110 of the embodiment, the power output to the ring gear shaft 126 is taken out of the arrangement between the first motor MG1 and the second motor MG2 via the power feed gear 128 linked with the ring gear 122. Like another power output apparatus 110A shown in FIG. 14 as a modified example, however, the power may be taken out of the casing 119, from which the ring gear shaft 126 is extended. FIG. 15 shows still another power output apparatus 110B as another modified example, wherein the engine 150, the planetary gear 120, the second motor MG2, and the first motor MG1 are arranged in this sequence. In this case, a sun gear shaft 125B may not have a hollow structure, whereas a hollow ring gear shaft 126B is required. This modified structure enables the power output to the ring gear shaft 126B to be taken out of the arrangement between the engine 150 and the second motor MG2.

Figure 16:
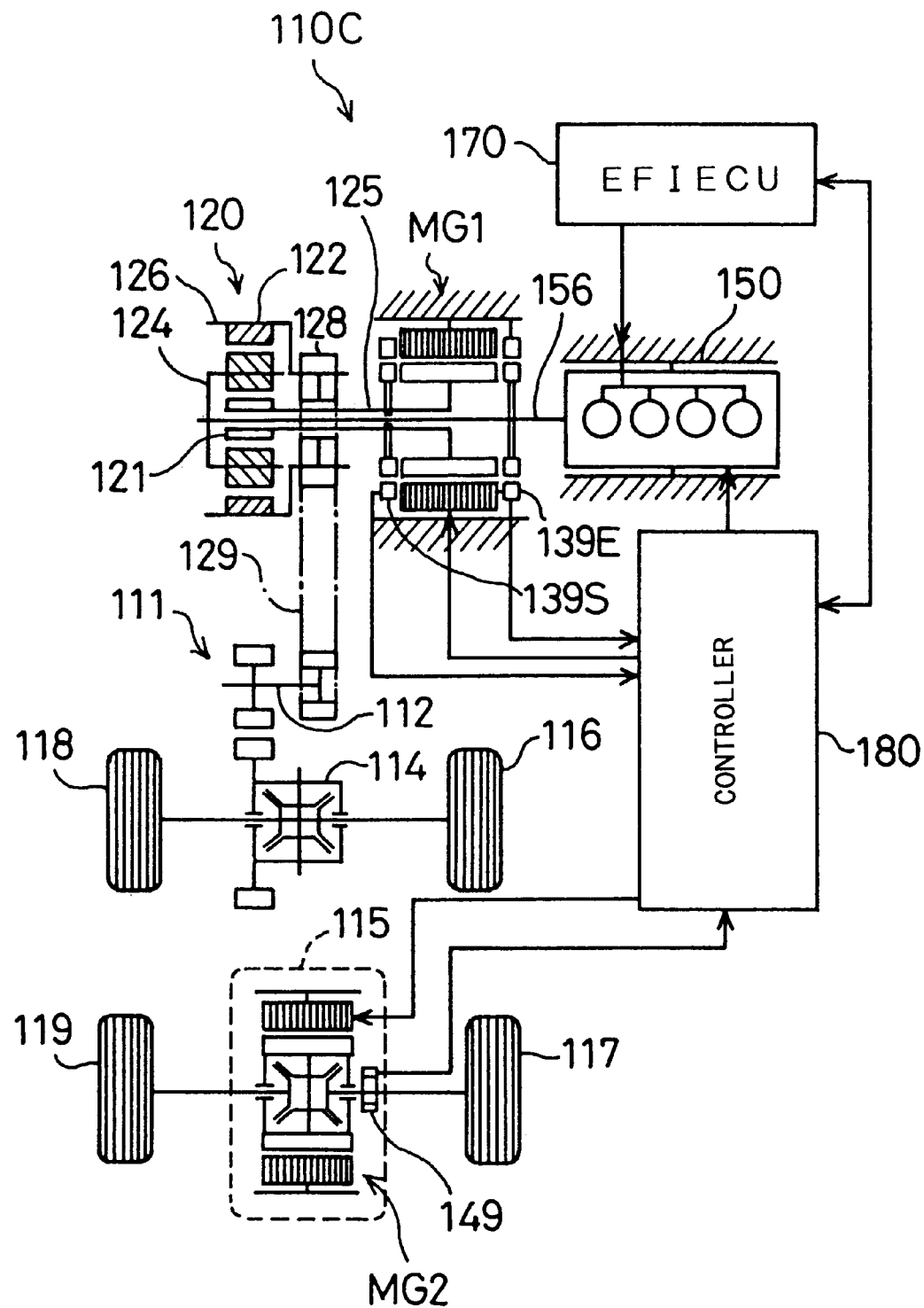
FIG. 16 schematically illustrates structure of a four-wheel-drive vehicle with a power output apparatus 110C incorporated therein.

The power output apparatus 110 of the embodiment and their modified examples discussed above are applied to the FR-type or FF-type two-wheel-drive vehicle. In another modified example of FIG. 16, however, a power output apparatus 110C is applied to a four-wheel-drive vehicle. In this structure, the second motor MG2 is separated from the ring gear shaft 126 and independently arranged in the rear-wheel portion of the vehicle, so as to drive the rear driving wheels 117 and 119. The ring gear shaft 126 is, on the other hand, connected to the differential gear 114 via the power feed gear 128 and the power transmission gear 111, in order to drive the front driving wheels 116 and 118. The torque control routine of FIG. 7 discussed above is also applicable to this structure.

The present invention is not restricted to the above embodiment or its modified examples, but there may be many modifications, changes and alterations without departing from the scope or spirit of the main characteristics of the present invention.

For example, although the gasoline engine is used as the engine 150 in the power output apparatus 110 of the embodiment, the principle of the invention is also applicable to other internal combustion engines and external combustion engines, such as Diesel engines, turbine engines, and jet engines.

In the power output apparatus 110 of the embodiment, the planetary gear 120 is used as the three shaft-type power input/output means. Another available example is a double-pinion planetary gear having plural sets of planetary pinion gears. One planetary pinion gear in each pair is linked with the sun gear while the other is linked with the ring gear, and the pair of planetary pinion gears are linked with each other to revolve around the sun gear while rotating on its axis. Any other device or gear unit, such as a differential gear, is also applicable for the three shaft-type power input/output means, as long as it can determine powers input to and output from the residual one shaft based on predetermined powers input to and output from any two shafts among the three shafts.

Permanent magnet (PM)-type synchronous motors are used as the first motor MG1 and the second motor MG2 in the power output apparatus 110 of the embodiment. Any other motors which can implement both the regenerative operation and the power operation, such as variable reluctance (VR)-type synchronous motors, vernier motors, d.c. motors, induction motors, superconducting motors, and stepping motors, may, however, be used according to the requirements.

Transistor inverters are used as the first and the second driving circuits 191 and 192 in the power output apparatus 110 of the embodiment. Other available examples include IGBT (insulated gate bipolar mode transistor) inverters, thyristorinverters, voltage PWM (pulse width modulation) inverters, square-wave inverters (voltage inverters and current inverters), and resonance inverters.

The battery 194 in the above embodiment may include Pb cells, NiMH cells, Li cells, or the like cells. A capacitor may be used in place of the battery 194.

Although the power output apparatus is mounted on the vehicle in the above embodiment, it may be mounted on other transportation means like ships and airplanes as well as a variety of industrial machines.

It should be clearly understood that the above embodiment is only illustrative and not restrictive in any sense. The scope and spirit of the present invention are limited only by the terms of the appended claims.

What is claimed is:

1. A power output apparatus for outputting power to a drive shaft, said power output apparatus comprising:

an engine having an output shaft;

a first motor having a rotating shaft and an inputting and outputting power to and from said rotating shaft;

a second motor inputting and outputting power to and from said drive shaft;

three shaft-type power input/output means having three shafts linking said engine and said drive shaft, said three shaft-type power input/output means inputting and outputting power to and from a residual one shaft, based on predetermined powers input to and output from any two shafts among said three shafts;

storage battery means being charged with an electric power output from said first motor, being discharged to supply an electric power input to said first motor, being charged with an electric power output from said second motor, and being discharged to supply an electric power input to said second motor;

target power setting means for setting a target power to be output to said drive shaft;

driving state setting means for setting a driving state of said engine based on the target power set by said target power setting means;

operation control means for controlling said engine and said first motor, in order to enable said engine to be driven in the driving state set by said driving state setting means;

power calculation means for calculating a power input to and output from said drive shaft via said three shaft-type power input/output means that reflects inertia of the engine and the first motor, accompanied by the control of said engine and said first motor by said operation control means; and motor control means for controlling said second motor, in order to enable the target power to be output to said drive shaft based on the power calculated by said power calculation means and the target power set by said target power setting means.

2. A power output apparatus in accordance with claim 1, wherein said driving state setting means comprises means for setting the driving state of said engine, in order to enable a power corresponding to the target power to be output from said engine.

3. A power output apparatus in accordance with claim 2, wherein said driving state setting means further comprises means for setting the driving state of said engine, in order to enhance an efficiency of said engine.

4. A power output apparatus in accordance with claim 1, wherein said power calculation means comprises means for calculating the power input to and output from said drive shaft, based on a rate of change of a revolving speed of said output shaft of said engine.

5. A power output apparatus in accordance with claim 4, wherein said driving state setting means comprises means for setting the driving state of said engine, in order to enable a power corresponding to the target power to be output from said engine.

6. A power output apparatus in accordance with claim 5, wherein said driving state setting means further comprises means for setting the driving state of said engine, in order to enhance an efficiency of said engine.

7. A power output apparatus in accordance with claim 1, wherein said power calculation means comprises means for calculating the power input to and output from said drive shaft, based on a rate of change of a revolving speed of said rotating shaft of said first motor.

8. A power output apparatus in accordance with claim 7, wherein said driving state setting means comprises means for setting the driving state of said engine, in order to enable a power corresponding to the target power to be output from said engine.

9. A power output apparatus in accordance with claim 8, wherein said driving state setting means further comprises means for setting the driving state of said engine, in order to enhance an efficiency of said engine.

10. A power output apparatus in accordance with claim 1, wherein said driving state setting means comprises means for setting an operation stop condition as the driving state of said engine when the target power is less than a predetermined value.

11. A power output apparatus in accordance with claim 1, wherein said driving state setting means comprises means for setting an operation stop condition as the driving state of said engine when a driver gives a predetermined instruction.

12. The power output apparatus according to claim 1, further comprising adjustment means for adjusting, when the target power of the drive shaft changes, the target power for the engine and the first motor to reflect the inertia found therein.

13. A method of controlling a power output apparatus for outputting power to a drive shaft, said method comprising the steps of:

(a) providing (1) an engine having an output shaft; (2) a first motor having a rotating shaft and inputting and outputting power to and from said rotating shaft; (3) a second motor inputting and outputting power to and from said drive shaft; (4) three shaft-type power input/output means having three shafts linking said engine and said drive shaft, said three shaft-type power input/output means inputting and outputting power to and from a residual one shaft, based on predetermined powers input to and output from any two shafts among said three shafts; and (5) storage battery means being charged with an electric power output from said first motor, being discharged to supply an electric power input to said first motor, being charged with an electric power output from said second motor, and being discharged to supply an electric power input to said second motor;

(b) setting a driving state of said engine based on a target power to be output to said drive shaft;

(c) controlling said engine and said first motor, in order to enable said engine to be driven in the driving state set in said step (b);

(d) calculating a power input to and output from said drive shaft via said three shaft-type power input/output means, accompanied by the control of said engine and said first motor in said step (c); and (e) controlling said second motor, in order to enable the target power to be output to said drive shaft based on the power calculated in said step (d) and the target power.

* * * * *